(12) United States Patent
Grossman

(10) Patent No.: US 8,981,582 B2
(45) Date of Patent: Mar. 17, 2015

(54) SUBMERGED POWER GENERATOR

(76) Inventor: Kurt Paul Grossman, Newport Beach, CA (US)

(*) Notice: Subject to any disclaimer, the term of this patent is extended or adjusted under 35 U.S.C. 154(b) by 589 days.

(21) Appl. No.: 12/690,060

(22) Filed: Jan. 19, 2010

(65) Prior Publication Data
US 2011/0012369 A1    Jan. 20, 2011

Related U.S. Application Data

(60) Provisional application No. 61/226,290, filed on Jul. 17, 2009.

(51) Int. Cl.
*H02K 7/18* (2006.01)
*F03B 17/04* (2006.01)
*H02K 53/00* (2006.01)

(52) U.S. Cl.
CPC ............... *F03B 17/04* (2013.01); *H02K 53/00* (2013.01); *Y02E 10/20* (2013.01)
USPC ............................................ 290/1 R; 60/495

(58) Field of Classification Search
USPC ......... 290/1 R, 53–54; 415/916; 60/495, 496, 60/398; 74/DIG. 009
See application file for complete search history.

(56) References Cited

U.S. PATENT DOCUMENTS

| | | | | |
|---|---|---|---|---|
| 3,857,242 A * | 12/1974 | Gilmore | ........................... | 60/495 |
| 4,074,526 A * | 2/1978 | West | ............................... | 60/325 |
| 4,538,415 A * | 9/1985 | Lebecque | ........................ | 60/639 |
| 4,598,211 A | 7/1986 | Koruthu | | |
| 4,718,232 A * | 1/1988 | Willmouth | ...................... | 60/495 |
| 5,424,582 A | 6/1995 | Trepl, II et al. | | |
| 5,753,978 A | 5/1998 | Lee | | |
| 5,944,480 A * | 8/1999 | Forrest | ............................... | 415/5 |
| 6,249,057 B1 * | 6/2001 | Lehet | ........................... | 290/1 R |
| 6,420,794 B1 * | 7/2002 | Cao | ................................. | 290/43 |
| 6,803,670 B2 | 10/2004 | Peloquin | | |
| 6,812,588 B1 | 11/2004 | Zadig | | |
| 6,930,406 B2 | 8/2005 | Montgomery | | |
| 7,134,283 B2 | 11/2006 | Villalobos | | |
| 8,112,992 B2 * | 2/2012 | Pirincci | ........................... | 60/495 |
| 2003/0059292 A1 * | 3/2003 | Baker | ........................... | 415/3.1 |
| 2003/0193808 A1 | 10/2003 | Mullen | | |
| 2005/0127681 A1 * | 6/2005 | Shaochun | ....................... | 290/54 |
| 2007/0018458 A1 | 1/2007 | Martinez | | |
| 2008/0001410 A1 | 1/2008 | Welch, Jr. | | |
| 2008/0246283 A1 | 10/2008 | Perin | | |
| 2009/0121486 A1 | 5/2009 | Ganley | | |
| 2009/0284021 A1 | 11/2009 | Scott | | |
| 2010/0126804 A1 * | 5/2010 | Sabapathy | ....................... | 185/32 |
| 2010/0127509 A1 * | 5/2010 | McCarthy | ..................... | 290/1 R |
| 2013/0168970 A1 | 7/2013 | Grossman | | |

FOREIGN PATENT DOCUMENTS

| JP | 10-141204 | 5/1998 |
|---|---|---|
| WO | WO 96/31696 | 10/1996 |
| WO | WO 2013/102138 A1 | 7/2013 |

* cited by examiner

*Primary Examiner* — Michael Zarroli

(57) ABSTRACT

A submerged power generator comprises a hull that defines an air space. A weighted container is allowed to fall within the air space during a power generating stroke. The container interacts with an apparatus so as to drive a generator during the power stroke. After the power stroke the container is ejected from the hull into the surrounding body of water. The container is made buoyant and thus floats upwardly during a buoyant stroke. The buoyant container is retrieved as it approaches the top of the hull and reintroduced into the hull for another power generating cycle.

7 Claims, 22 Drawing Sheets

US 8,981,582 B2

SUBMERGED POWER GENERATOR

RELATED APPLICATIONS

The present application claims the benefit of U.S. Provisional Application Ser. No. 61/226,290, which was filed on Jul. 17, 2009, the entirety of which is hereby incorporated by reference

BACKGROUND OF THE INVENTION

1. Field of the Invention

The present invention is related to power generators, and more particularly to power generators using renewable sources.

2. Description of the Related Art

Energy, particularly electric power, is essential for maintaining the comforts of life and achieving high levels of industrial productivity. Traditionally, power generation has involved the use of non-renewable sources such as coal, oil and nuclear fuel. Generating power from such sources involves considerable expense in the acquisition of the source material and causes substantial damage to the environment in the form of pollution. Some power generators use renewable sources such as solar and wind energy, and thus have reduced environmental impact. However, the availability of wind and solar energy depends on the environment and can be unpredictable. Hydropower involves damming large bodies of water and running water through turbines to generate electricity. Although hydropower does not generate pollutants per se, it requires a unique geography in order to be effective, and creates radical changes to the environment.

SUMMARY OF THE INVENTION

Accordingly, there is a need in the art for a power generation system and method that can employ renewable resources, has relatively little effect on the environment, can be operated without relying upon changing environmental conditions, does not substantially alter the environment in which it is placed, and can be employed in many locations.

In accordance with one embodiment the present invention provides a submerged power generator, comprising a hull configured to enclose an air space, the hull configured to be submerged in a body of water, the hull having an entry area and an exit area, the entry area being disposed above the exit area; and a plurality of weighted containers. The entry area is configured so as to selectively allow a weighted container to enter the air space; and the exit area configured to selectively eject a weighted container from the air space to a surrounding body of water. An electric power generation system is disposed within the hull air space, and is configured to engage a weighted container within the air space and convert energy lost by the weighted container as it is drawn downward by gravity into electricity. Each weighted container enters the hull air space at the entry area, engages the electric power generation system as it falls within the hull air space, and is ejected out of the air space into the surrounding body of water at the exit area.

In some such embodiments, the electric power generation system comprises a mechanical apparatus that engages the container and is adapted to drive an electricity generator as the container falls. Some embodiments additionally comprise a secondary power conversion system configured to capture and store energy lost by the container as it is drawn downward by gravity in a non-electrical form.

In further embodiments the mechanical apparatus comprises a lever arm having first and second ends, the first end being selectively attachable to the weighted container, the second end connected so as to drive the flywheel as the weighted container on the first end is drawn downwardly by gravity, and the secondary power conversion system comprises an air compressor, the compressor positioned so that the lever arm drives the compressor so as to compress air as the first end of the lever arm falls. Such embodiments may additionally comprise a tank, and the compressor is configured to direct pressurized air to the tank. In further embodiments the exit area comprises an exit hatch configured to be operated by an actuator, and the actuator is configured to be actuated using pressurized air from the air tank.

Additional embodiments combine a submerged power generator with a water-borne industrial complex having a plurality of tools configured to be actuated by pressurized air, and additionally comprising a system for distributing pressurized air from a tank to a plurality of locations within the industrial complex.

In further embodiments each container is configured to selectively modify its buoyancy. In yet additional embodiments the hull is configured to be positively buoyant and is attached to an anchoring system configured to anchor the hull to a floor of a surrounding body of water, wherein the anchoring system is configured to selectively change the depth of the hull.

In another embodiment a method of generating electricity is provided, comprising providing a hull at least partially submerged in a body of water, the hull configured to enclose an air space therewithin and having an entry area and an exit area, providing a plurality of weighted containers, engaging a weighted container with an electric power generating system disposed within the air space, and directing the weighted container to fall a power stroke distance within the air space so that energy from the falling weighted container is used by the electric power generating system to generate electricity. The method further comprises ejecting the weighted container out of the air space into the surrounding body of water, allowing the weighted container to float upwardly, and, after the weighted container has floated upwardly, retrieving the weighted container and directing it through the entry area into the air space. The entry area is vertically higher than the exit area.

In another embodiment the weighted container comprises a mechanism for changing its buoyancy, and the method additionally comprises the weighted container changing its buoyancy.

In some embodiments the weighted container is configured to be negatively buoyant at a water depth corresponding to the depth of the exit area, and the method comprises the weighted container changing its buoyancy so that it becomes positively buoyant after being ejected into the surrounding body of water so that the container floats upwardly within the body of water. In some such embodiments changing the buoyancy of the weighted container to make it positively buoyant comprises pushing water out of the container. Some embodiments additionally comprise changing the buoyancy of the weighted container after retrieving the container so that the container would be negatively buoyant at a water depth corresponding to the depth of the exit area. Sometimes changing the buoyancy to negative buoyancy comprises adding water to the container.

Yet another embodiment additionally comprises braking the weighted container. Some such embodiments additionally comprise mechanically engaging an apparatus moving with the container with an air compressor and pressurizing air as the container moves downwardly. Further embodiments additionally comprise directing the container into an exit chute in the exit area, and directing pressurized air into the chute above the container so as to push the container out of the exit chute into the body of water.

DETAILED DESCRIPTION OF PREFERRED EMBODIMENTS

Figure 1:
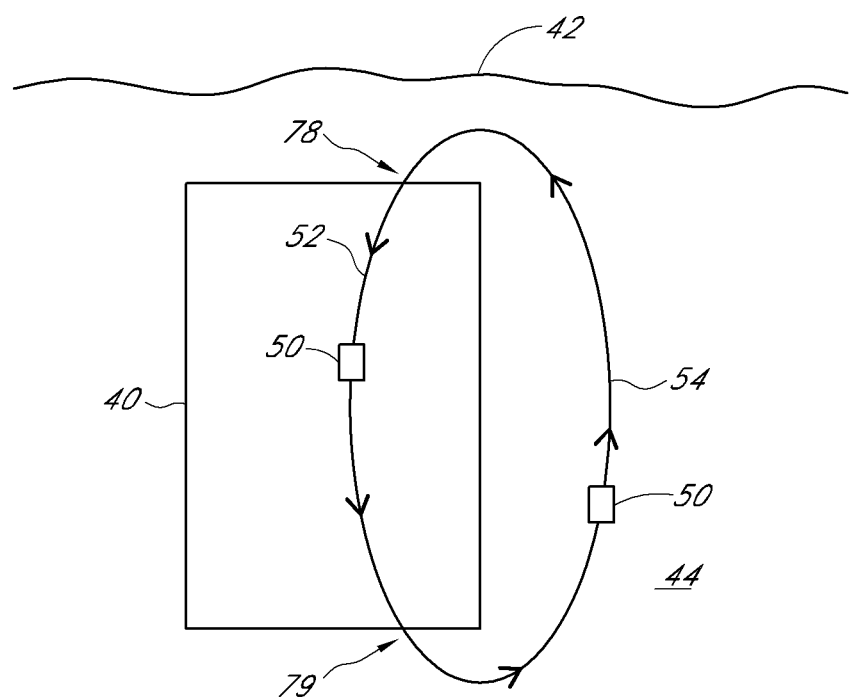
FIG. 1 is a schematic representation of a submerged power generator showing operational theory in accordance with a preferred embodiment.

With initial reference to FIG. 1, the present specification describes embodiments of systems and methods for generating power. More particularly, a submerged power generating system employs both principles of gravitational potential energy and buoyancy and operates between an enclosed air-filled system and a surrounding body of water.

FIG. 1 is a schematic operational diagram demonstrating an operational theory in accordance with a preferred embodiment. As shown, a hull 40 is submerged generally below the surface 42 of a body of water 44 such as an ocean or lake. The hull 40 defines an enclosed air space 48. A device 50 having a mass, such as a container holding weight such as water, has gravitational potential energy when positioned generally near the top of the enclosed air space 48, which is a first environment having a first fluid density. The container 50 is more dense than the surrounding air and thus is allowed to fall by virtue of gravity, and preferably is connected to a generator so that as the device loses gravitational potential energy at least a portion of that energy is converted into another form of energy such as electricity. This action can be referred to as a gravity-driven power generation stroke 52, or power stroke. Once the power stroke is completed, the container 50 is ejected from the hull 40 into the surrounding body of water 44, which is a second environment having a second fluid density.

Once ejected from the hull 40 into the body of water 44, the container 50 is less dense than the surrounding water and thus exhibits a measure of buoyancy, floating upwardly. This action can be referred to as a buoyancy-driven return stroke 54, or buoyant stroke. Once the container 50 is at or near the top of the hull 40, it is retrieved and made to again enter the air space within the hull 40. Once within the hull, the container again performs a power stroke, followed by a buoyant stroke, and the cycle continues. Power is generated as the massive container 50 falls during each power stroke, but no power is used as the container rises during the buoyant stroke.

Figure 2:
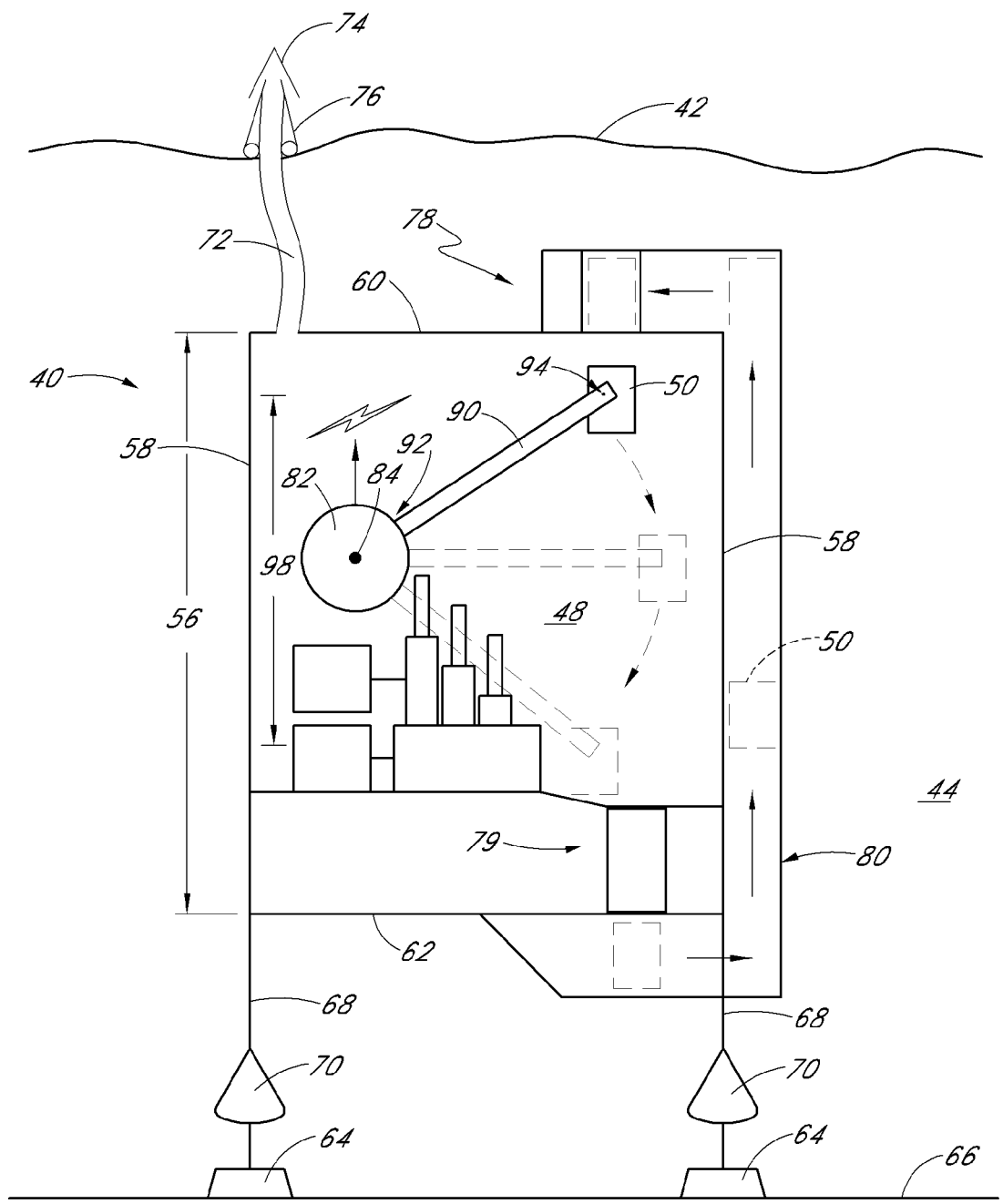
FIG. 2 is a schematic representation of a submerged power generator in accordance with one embodiment.

With reference next to FIG. 2, a schematic representation of a preferred embodiment shows a body of water 44 in which a large hull 40 is submerged. Preferably the hull 40 has a relatively large height or draft 56, and is constructed to endure the rigors, pressures, and wear and tear of an industrial installation in an underwater, saltwater or fresh water environment. In the preferred embodiment, the hull 40 is constructed of steel and is treated with anti-corrosive treatments such as marine paint. Other materials and treatments can be employed as appropriate. Preferably the draft 56 or height is substantially large so as to take maximum advantage of the gravitational potential energy to be converted within the hull 40. For example, embodiments may employ hulls having a draft 56 of 20 yards, 50 yards, 100 yards, 200 yards, or more, as desired and as construction technology permits.

In the illustrated embodiment, the hull 40 is completely submerged under the surface 42 of the water 44. In other embodiments, a top portion of the hull may be exposed somewhat above or generally even with the surface of the water. The illustrated hull 40 is generally rectangular in shape, having opposing vertical side walls 58 and top and bottom walls 60, 62. In the present embodiment, the hull 40 is anchored in place. More specifically, anchors 64 or pilings are driven into the ocean floor 66, and cables 68 chains or the like extend from the hull to the anchors 64. Ballasts 70 may also be provided to assist in holding the hull 40 submerged stably in the body of water 44. In some embodiments, portions of the hull may define ballast tanks, which can be filled with water or the like to help maintain the hull in a submerged condition. It is to be understood that additional or alternative structure may be employed to secure the hull in place.

The hull 40 preferably encloses an air space 48 therewithin. In the illustrated embodiment, a ventilation conduit 72 extends upwardly from the hull and above the surface 42 of the body of water. A vent 74 supported by the conduit 72 enables air to be ventilated into and out of the air space 48. Preferably the vent 72 is supported by a buoy 76 or the like and configured to withstand environmental factors such as inclement weather, ship impacts and the like without allowing substantial water incursion into the hull 40. In another embodiment, instead of or in addition to a vent the hull can include machinery for re-oxygenating air within the hull and/or generating oxygen from the surrounding water.

An entry area 78 at or near the top of the hull 40 preferably is configured so that a weighted container 50 in the body of water 44 can enter into the air space 48 within the hull 40. An exit area 79 is provided at or near the bottom of the hull and is configured so that once a weighted container 50 has completed its power stroke, it proceeds to the exit area 79 in which it is ejected from the air space 48 and into the surrounding body of water 44. A guide or fence 80 is disposed around at least part of the hull about the outside of the hull 40. The fence 80 is configured to contain and guide containers 50 in the body of water. More particularly, the fence 80 defines a path containers 50 may follow from the exit area 79 along the outside of the hull and upwardly to the entry area 78. In the preferred embodiment, the fence 80 has a mesh or grate construction and is made of corrosion-resistant materials such as stainless steel. Other materials such as anti-corrosion treated steels and the like can also be employed. The mesh or grate construction of the fence enables the body of water to freely communicate through the fence.

Figure 3:
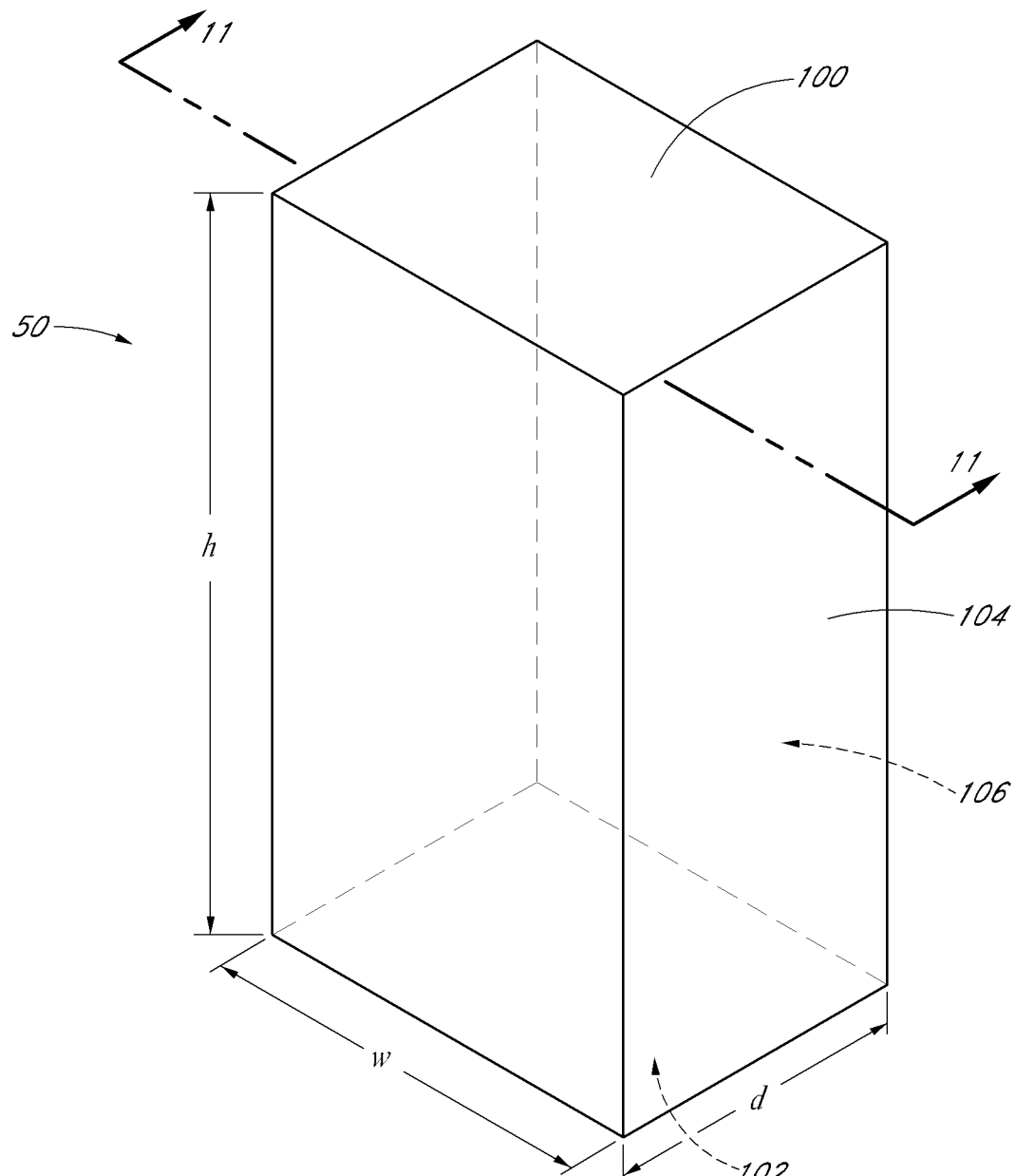
FIG. 3 is a perspective view of an embodiment of a weighted container configured to be employed with the submerged power generator of FIG. 2.
Figure 4:
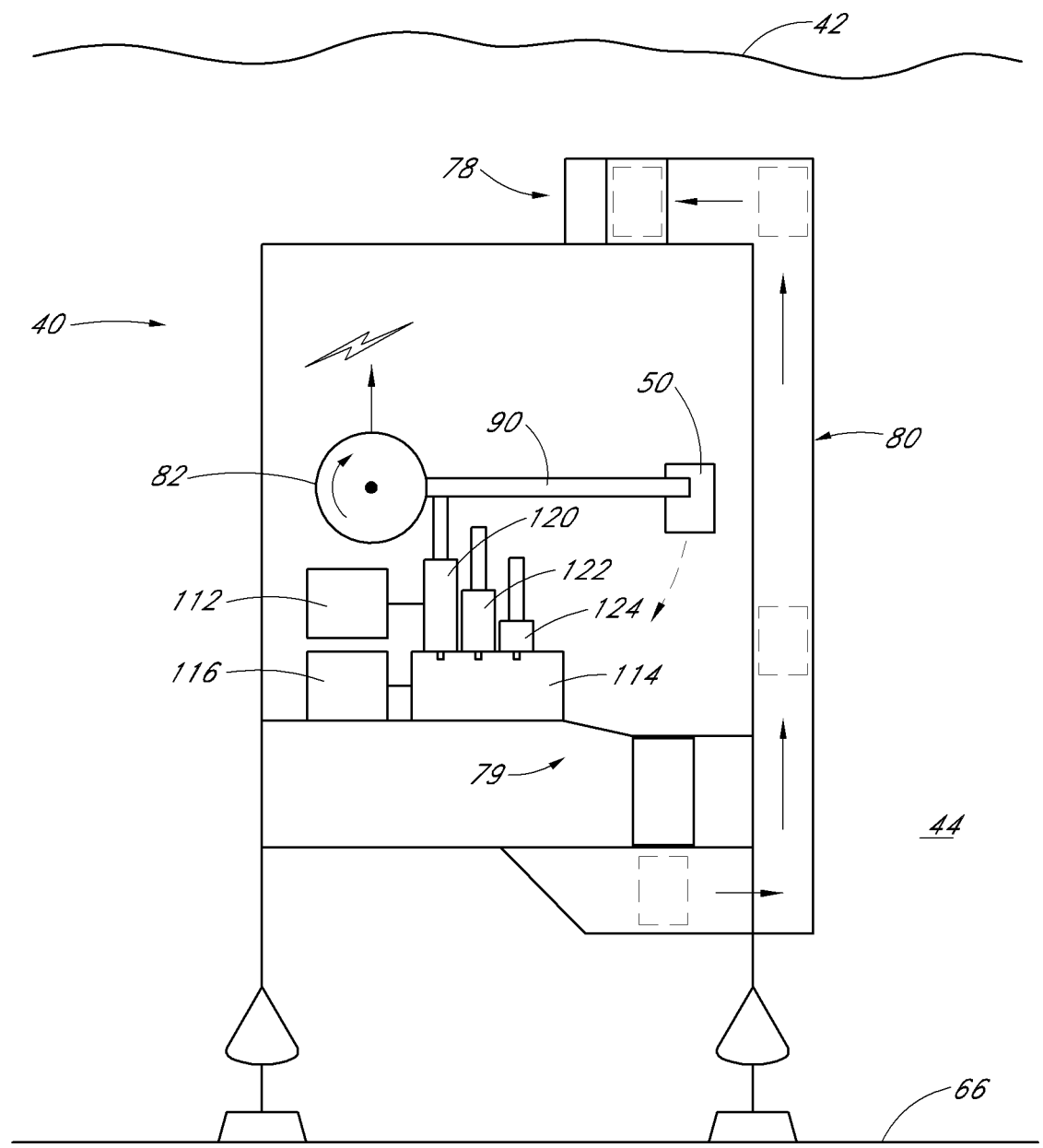
FIG. 4 shows the submerged power generator of FIG. 2 during a gravity-driven power stroke.
Figure 5:
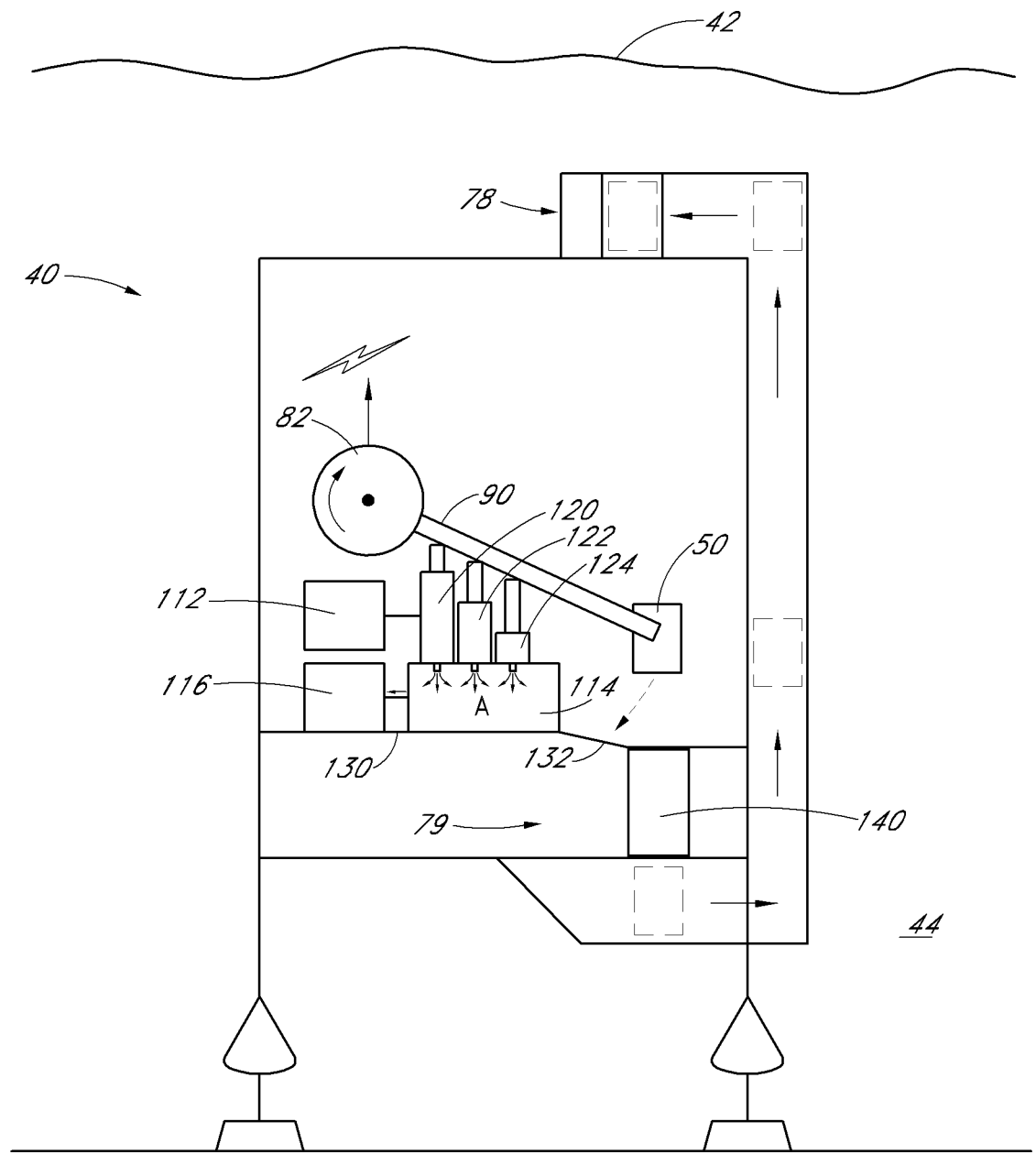
FIG. 5 also shows the submerged power generator of FIG. 2 during the gravity-driven power stroke.

With continued reference to FIG. 2 and additional reference to FIGS. 3-5, preferably an electric power generation system is provided comprising a flywheel 82 and an axle 84 configured to be driven by a lever arm 90. A first end 92 of the lever arm 90 is preferably connected to the flywheel 82 so as drive the flywheel. A weighted container 50 is attached to a second end 94 of the lever arm 90 at a connection point. The container 50 preferably is substantially heavy, most preferably being filled with water. As shown, the weighted container 50 falls with gravity a vertical power stroke distance 98 along a downward path, thus driving the flywheel 82. The flywheel 82 in turn is connected to an electric generator so that the power stroke of the container falling along the path causes electricity to be created. Such electricity can be communicated directly to wires that run to shore and eventually join with a commercial electricity grid delivering electricity to consumers. In other embodiments the electricity is provided solely to properties and structures associated with the power generator. In still other embodiments one or more electricity storage devices such as batteries are disposed within the hull, and all or some of the generated electricity is maintained in the batteries until needed for use.

At the end of the power generation stroke, the container 50 is disconnected from the second end of the lever arm 90. Preferably, the lever arm is biased upwardly. Thus, once the weighted container is disconnected from the lever arm, the arm 90 automatically moves upwardly to return to the top of the hull 40 so as to connect to another weighted container, and perform another power stroke. The lever arm can be biased by any desired structure such as a spring, a counterweight, and electric, hydraulic or pneumatic motors or the like.

In the illustrated embodiment the lever arm 90 stops and reverses its motion. During the period when it is stopping and reversing, the lever arm is preferably disconnected from any direct driving connection with the flywheel 82 and/or generator so that stopping of the lever arm does not also stop rotation of the generator. Most preferably, the lever arm 90 drives the flywheel through a drive interface such as gearing so that during substantially the entire power stroke the lever arm will drive the flywheel, even if the lever arm is moving comparatively slowly. In some embodiments, the drive interface may include a transmission such as a multiple gear-ratio transmission in which optional gears for a given state may be selected and/or a continuously variable transmission that is configured to optimize a mechanical advantage for driving the flywheel and/or generator.

In some embodiments, the lever arm connects to a drive interface by way of a selectively-engageable hydraulic clutch or the like so that the lever arm can be selectively engaged or disengaged from the drive interface. In such embodiments, the hydraulic clutch is disengaged as the lever arm stops to release the container, and while it returns to its upper position, and is re-engaged during the next power stroke. In still other embodiments, rather than an upwardly-biased and returning lever arm, the flywheel is driven by a drive wheel having lever arms that move circumferentially about an axle.

In preferred embodiments, the electricity generator is not necessarily positioned immediately adjacent the flywheel 82. Rather, the flywheel may be configured to drive a driveshaft or the like that in turn rotates a generator spaced from the flywheel. For example, some power generator embodiments may employ several power generating stations such as the lever arm 90/flywheel 82 arrangement discussed above and shown in FIG. 2. For example, a hull may include a plurality of such stations disposed side-by-side and sharing a common driveshaft that drives a generator disposed at some point along the shaft. In some embodiments, the hull may be divided into several compartments, with each compartment comprising a power generating arm and flywheel as discussed herein. Preferably the compartments are sealed to prevent water intrusion between compartments.

With particular reference to FIG. 3 the weighted container 50 preferably is constructed of a sturdy material such as structural steel so as to be durable during the wear and tear of an industrial marine environment. The weighted container 50 also preferably is configured to have a relatively large mass so as to maximize its potential gravitational energy as it falls during the power stroke. In a preferred embodiment, top and bottom and/or side walls 100, 102, 104 of weighted container cooperate to define enclosed space 106 that may selectively be filled with water, as will be described in more detail below. The illustrated weighted container 50 has a generally rectangular cross-section having a height h, width w and depth d, and the height is greater than the width and depth. A surface area of the bottom wall of the container is defined by the width and depth. Most preferably, the weight of the container during the power stroke is configured to be sufficiently large so that the downward force exerted on the container 50 by gravity is greater than a force that water at the depth of the bottom 62 of the hull would apply across surface area of the bottom wall 102.

The embodiment illustrated FIGS. 2-5 also comprises a pneumatic power generation system comprising a first or staging air tank 112, second or medial tank 114, and third or primary air tank 116. Preferably a plurality of piston-type compressors 120, 122, 124 are configured to compress air into the medial air tank 114. With continued reference to FIGS. 2-5, during the power generation stroke, substantial downward momentum may be generated as the container 50 falls while connected to the lever arm 90. As shown specifically in FIGS. 4 and 5, at a point along the downward path of the power stroke, a portion of the lever arm 90 contacts a compressor arm of a first air compressor 120. As the container continues to fall and the lever continues to rotate, the lever engages second and third compressors 122, 124. This compressing action has the effect of both pressurizing air A in the medial air storage tank 114 and braking the falling container 50. Thus, the kinetic energy and at least some of the gravitational potential energy of the container is captured and stored as pressurized air as the container falls, and the container is slowed so as to stop at the correct and safe point at the bottom of its power stroke.

With continued reference to FIGS. 4 and 5, preferably pressurized air is desired to be maintained in the primary tank 116 within a certain specific range of pressures, preferably exceeding the pressure exerted by the body of water 44 at or near the bottom 62 of the hull 40. The first or staging tank 112 preferably includes air that is pressurized at a comparably low pressure, such as air obtained from the environment and/or scavenged from tooling or other sources as discussed below. The staging tank 112 provides air to the compressors which, as just discussed, further pressurize the air into the medial storage tank 114. When the pressure in the medial tank exceeds a designated threshold pressure, such as during the air pressurization portion of the power stroke, air flows into the primary storage tank 116. Thus air pressure between the tanks is regulated within a chosen range. In some embodiments a motorized air compressor may additionally be employed as desired to maintain appropriate pressures.

Preferably valves are provided to maintain appropriate control over airflow between the tanks. In the illustrated embodiment, three compressors have been shown. This is a schematic illustration to demonstrate the use of multiple compressors, and it is to be understood that one or many compressors may be employed. Additionally, preferably the compressors are arranged in stages so that one or more of the compressors may compress air to a higher pressure than others of the compressors, which may, for example, pressurize a larger volume of air at a lower pressure. The staging and placement of the compressors preferably is chosen so as to generate a desired amount of compressed air, while simultaneously providing a desired amount of braking for the falling container. Preferably the threshold pressure and valve configuration is selected so that the falling container is braked to be stopped at an appropriate point.

In another embodiment, one or more radial-type air compressors may be configured to be selectively driven by the flywheel. As such, during at least a portion of the power stroke rotation of the flywheel pressurizes air. Embodiments are contemplated in which such radial compressors are provided instead of or in addition to the piston-type compressors discussed above. A hydraulic clutch or other selective engagement mechanism can be configured so that the flywheel and/or lever arm engages a radial compressor during a portion of the power stroke, and the structure may be configured so that the lever arm successively engages a plurality of radial-type air compressors during the power stroke so as to apply braking as desired. Still further, in some embodiments, air compression may be preferred over electricity generation, and one or more air compressors may be provided instead of an electricity generator.

Figure 6:
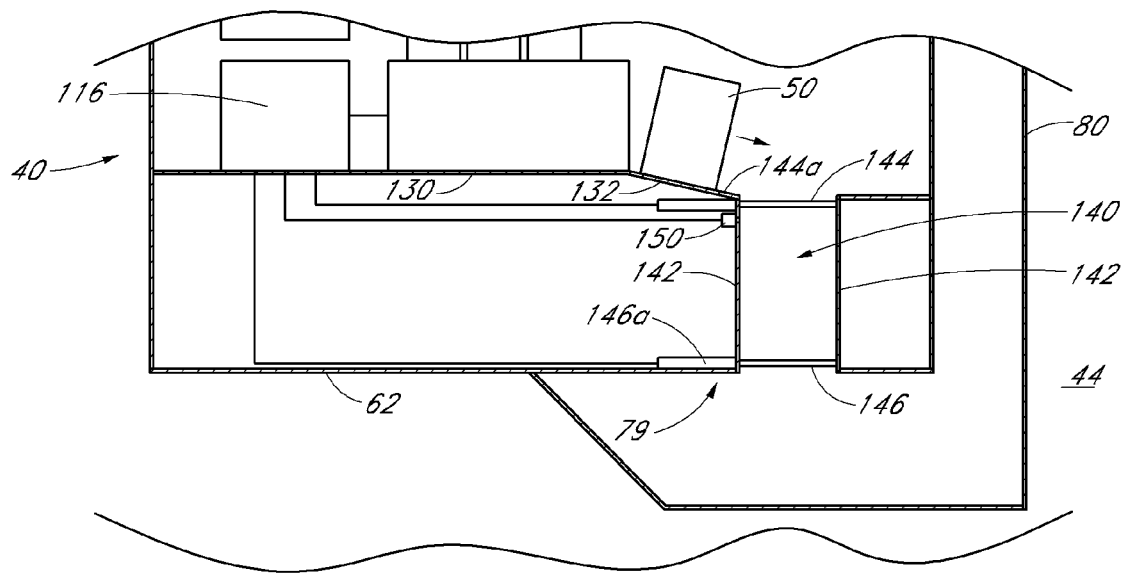
FIG. 6 shows a portion of the underwater power generator of FIG. 2 in which a weighted container is progressing toward an exit area.

With particular reference next to FIG. 6, once the container 50 has completed its power stroke, it is disconnected from the lever arm and released to a floor 130 of the hull. Preferably the floor 130 has an inclined portion 132 upon which the container slides or rolls toward an exit chute 140 of the exit area 79. As illustrated in FIG. 6, preferably the exit chute 140 is elongate and defined by walls that extend from the floor 130 to the bottom 62 of the hull. The illustrated chute 140 has an inner hatch 144 and an outer hatch 146, both of which preferably are pneumatically operated by corresponding pneumatic actuators 144a, 146a using pressurized air sourced from the primary tank 116. Thus, pressurized air generated during the power stroke is utilized during other stages of operation. In other embodiments, the hatches 144, 146 may be operated by other structure and methods such as solenoids or the like. Also, in other embodiments pressurized air or electricity can be used to apply pressure to a hydraulic system which in turn operates aspects such as hatches and the like. In a preferred embodiment the hatches are sliding, single-panel doors. Other hatch configurations, such as multi-panel and/or swinging doors, can be used as desired.

Figure 7:
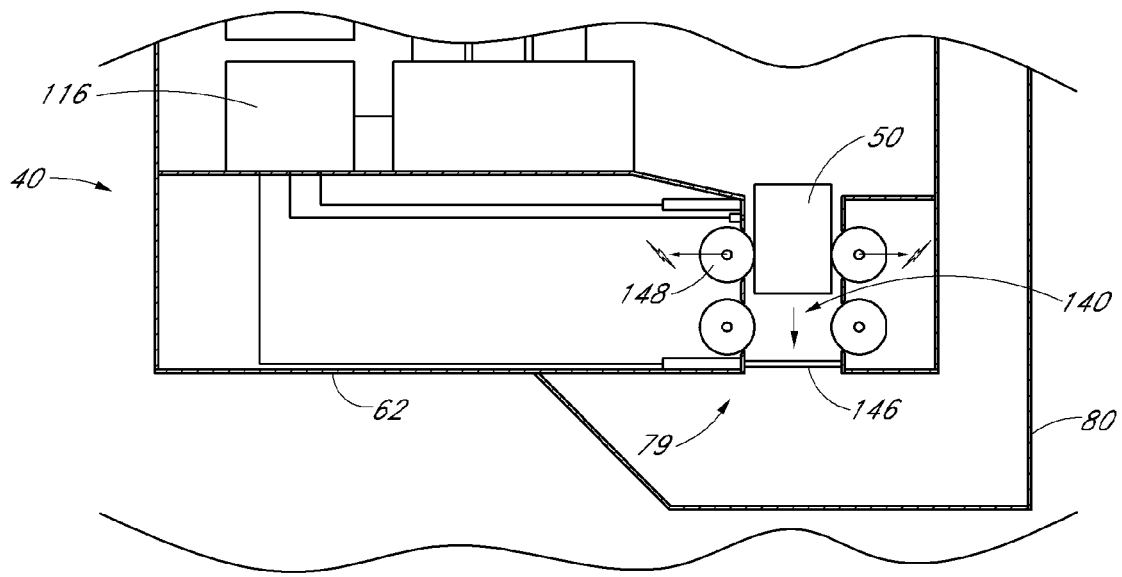
FIG. 7 shows the configuration of FIG. 6 with the weighted container entering an exit chute.

With additional reference next to FIG. 7, when the container 50 is in position, the inner hatch 144 preferably is opened, allowing the weighted container to fall into the exit chute 140. FIG. 7 shows another electricity generation and braking system disposed in the exit chute, comprising wheels 148 that both control of the weighted container's descent and drive a generator so that electricity is generated in the process, preferably in a manner similar to automotive regenerative braking.

Figure 8:
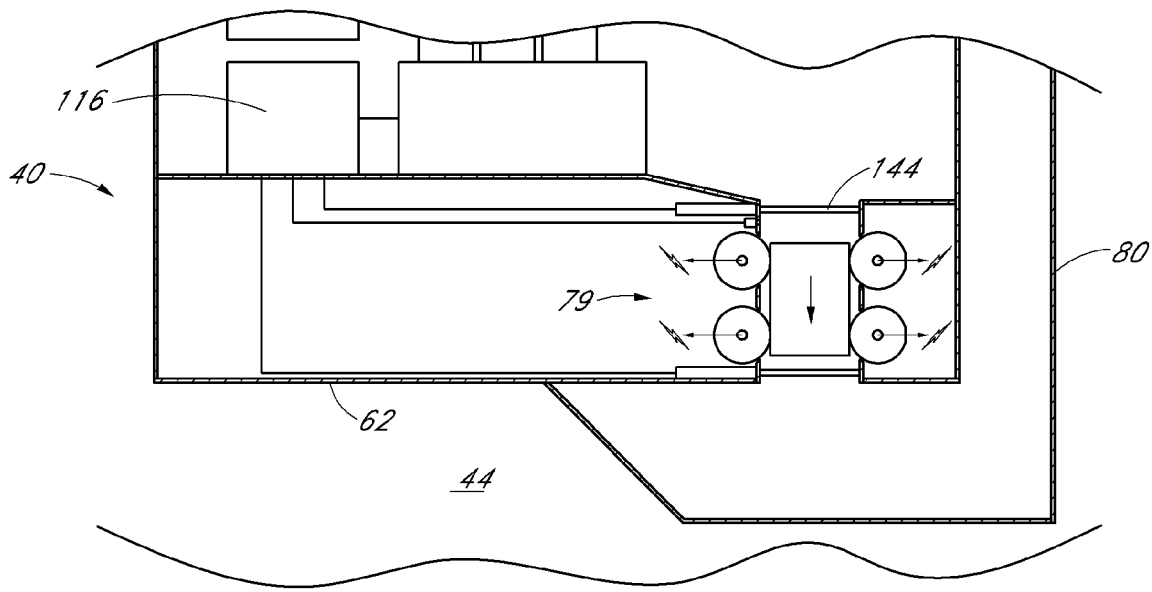
FIG. 8 shows the configuration of FIG. 7 with the weighted container progressing through the exit chute.
Figure 9:
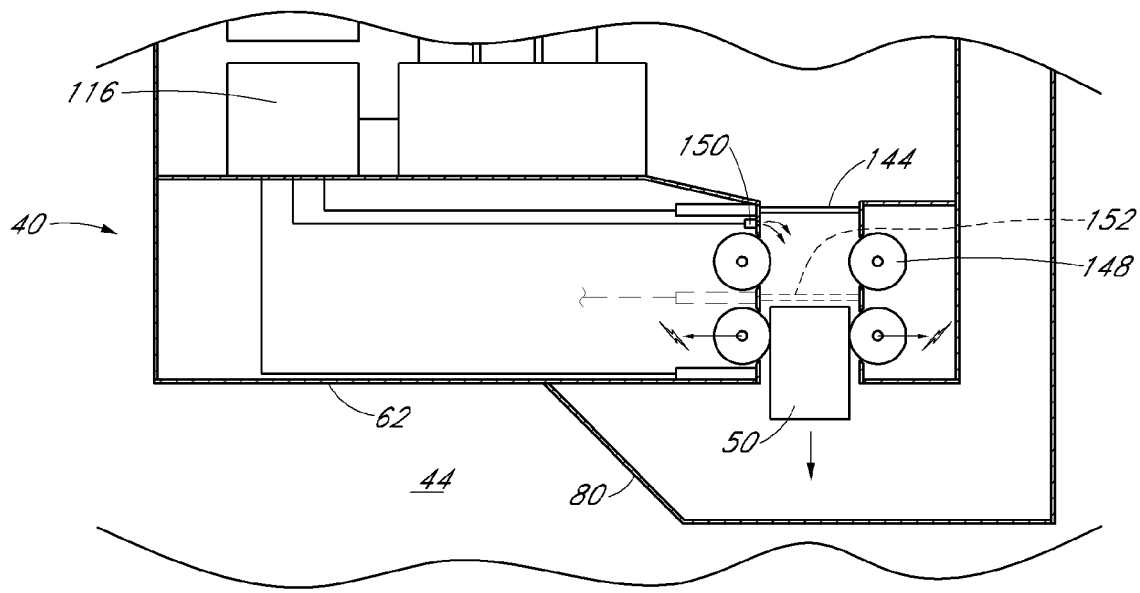
FIG. 9 shows the configuration of FIG. 7 with the weighted container exiting the exit chute.

As shown next in FIG. 8, preferably the inner and outer hatches 144, 146 are both closed when the container 50 is fully within the exit chute 140. Also, preferably size tolerances are particularly close so that there is little space between exit chute walls 142 and the container 50. As shown in FIG. 9, after the top hatch 144 has been closed with the container 50 in the chutes 140, the bottom hatch 146 may then be opened and, due to its weight, the container 50 continues to fall out of the chute 140 and into the surrounding body of water 44. Preferably a pressurized air source 150 delivers pressurized air into the chute 140 above the container 50 so as to relieve any resistance due to vacuum and to urge the container through the outer hatch 146. In the preferred embodiment, the air is pressurized in a range that approximates or exceeds the pressure of the water at the depth of the outer hatch. Thus, the container is readily ejected while minimizing or preventing water entry into the exit chute and hull.

In some embodiments, and as shown schematically in phantom in FIG. 9, one or more additional hatches 152 may be provided so that once the container passes a particular point, a hatch 152 at that point is closed so as to further reduce both the likelihood of water incursion and the amount of or need for pressurized air to prevent such incursion. Once the container clears the bottom hatch 146, the hatch is closed quickly, and the container continues to sink. Pressurized air within the exit chute can then be returned to one of the tanks such as the medial tank 114 or staging tank 112 for repressurization, or can be pumped back to the primary tank 116.

Figure 10:
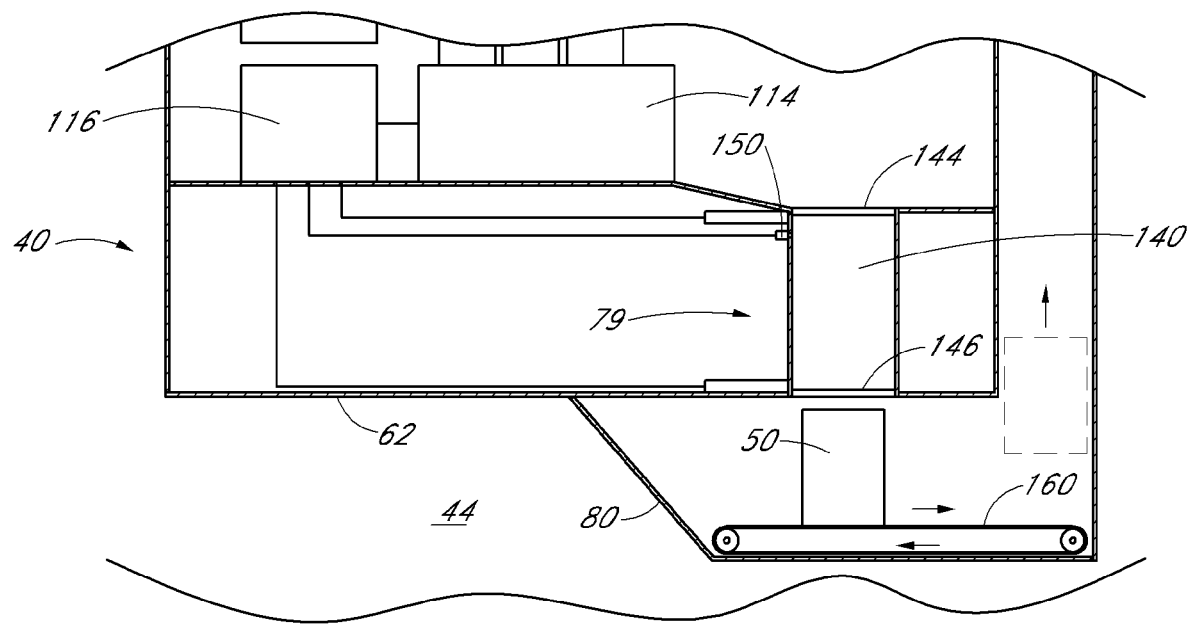
FIG. 10 shows the configuration of FIG. 7 with the weighted container having exited the hull.

Once clear of the hull, the container is fully within the body of water as shown in FIG. 10. Preferably, the outer hatch 146 of the exit chute 140 opens within the fence or guide 80 so that the container 50 is within the confines of the fence 80. The container preferably sinks until it contacts the bottom of the fence. In the illustrated embodiment, a conveyor 160 is provided for moving the container 50 away from the exit chute 140 and toward the side of the hull 40. It is to be understood that other apparatus can be employed to move the container away from the exit chute. For example, hydraulically or pneumatically operated robotic or remote control arms, submarines, other submersible devices or the like can be employed. Additionally, in some embodiments, the fence can be inclined so that as the sinking container contacts the fence, the container is deflected urged to the side of the hull and away from the exit chute.

Figure 11:
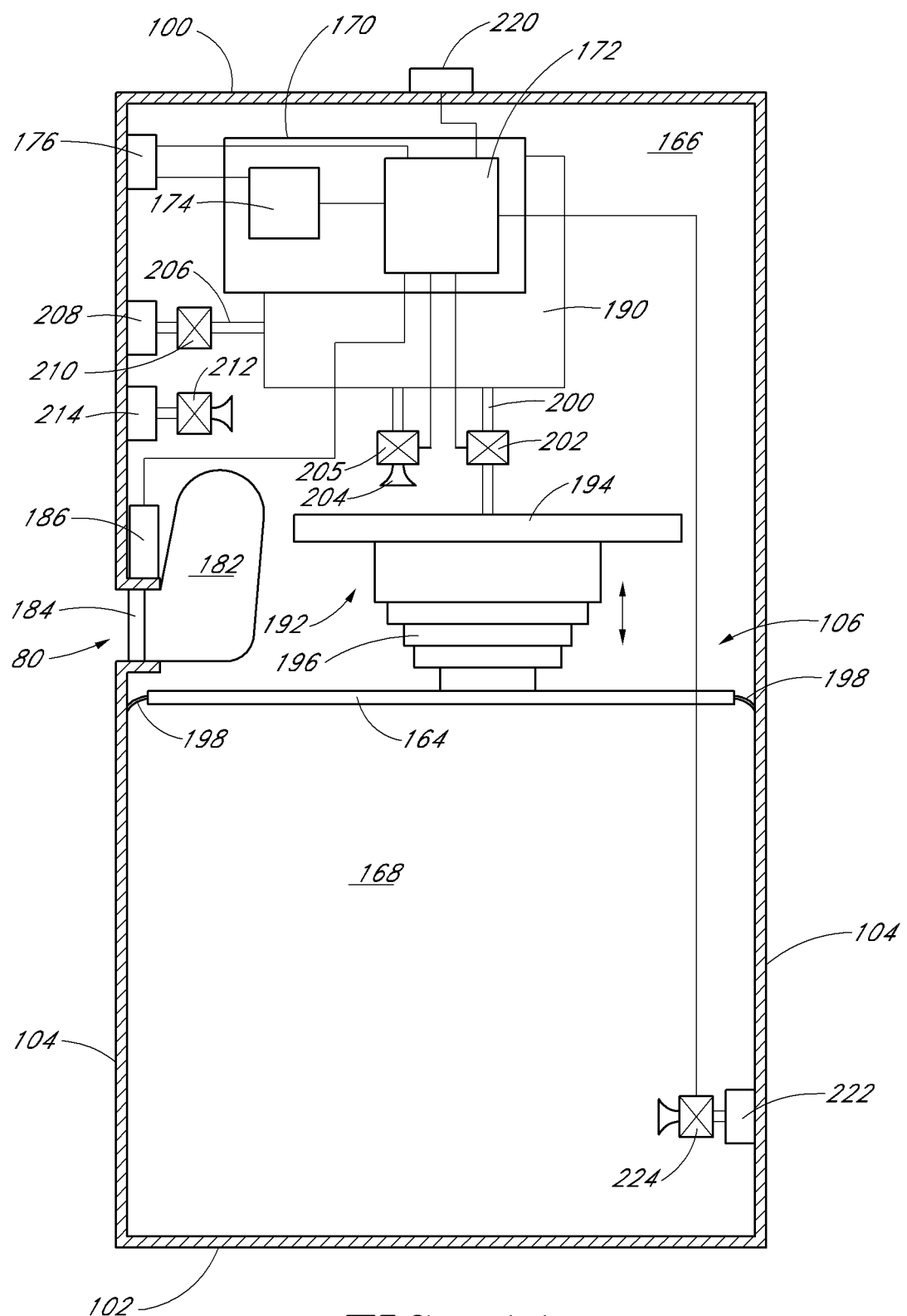
FIG. 11 is a sectional view of the container of FIG. 3 taking along line 11-11.

With reference next to FIG. 11, an embodiment of a variably-weighted container 50 is schematically shown in section so that interior structure is visible. The illustrated variably weighted container can selectively change its weight and increase or decrease its buoyancy. The side structural vertical and structural, vertical and top and bottom walls preferably are relatively thick and sturdy. A divider plate 164 divides the space 106 within the container space 166 and a lower space 168. Preferably an electronic unit 170 includes a processor or controller 172 and a power source such as a battery 174. An interface 176 is disposed on a side wall of the container to enable outside access for charging of the battery 174 and/or programming of the controller 172 when appropriate.

A mounting portion 180 is also provided along a side wall of the container 50. In the illustrated embodiment the mounting portion 180 along a side wall of comprises an inlet 182 adapted to accommodate a pin or the like on the second end of the lever arm so as to rotatably connect the container to the lever arm. Preferably a latch 184 opens to allow the lever arm pin to extend into the inlet 182 but closes to ensure a secure connection during the power stroke. In the illustrated embodiment, a solenoid 186 actuates the latch 184, which solenoid is electronically controlled by the controller 172.

With continued reference to FIG. 11, preferably a pressure vessel 190, more precisely a pressurized air tank, is enclosed within the upper space 166. Additionally, a pneumatic actuator 192 comprises of a mount 194 and a pneumatically operated ram 196 attached to the divider plate 164. The divider plate 164 has seals 198 on opposing sides, which seals 198 engage the container side walls 104 so as to seal the lower space 168 from the upper space 166. An air line 200 extends from the air tank 190 to the pneumatic actuator 192, and air supply is controlled through a valve 202 which is electronically controlled by the controller 172 so as to control the actuator.

An opening 204 from the air tank 190 into the upper air space 166 is also provided, preferably having a valve 205 electronically controlled by the controller 172. An air fill line 206 and interface 208 extend to the side wall of the container so that the air tank 190 can be selectively filled from a source outside the container 50. A valve 210 such as a one way valve is provided to prevent leakage. Further, a pressure release valve 212 and interface 214 is also provided through the side wall 104 of the container so as to selectively allow air to be evacuated from the upper space 166 when desired.

A pressure sensor 220 preferably is configured to sense the pressure outside of the container and electronically communicate data concerning such pressure to the controller 172, which evaluates such data and controls various valves and the like in accordance with such data. The lower space 168 also preferably has at least one water vent 222 that is selectively closed by a valve 224, that is also controlled by the controller.

As discussed above, preferably the weighted container 50 is particularly heavy and can be filled with water. In the illustrated embodiment, the water fills the lower space 168 of the container. It is to be also understood that the drawing in FIG. 11 is schematic, and that in other embodiments the upper and lower spaces 166, 168 may have different relative dimensions than as shown in the illustrated embodiment.

In operation, preferably the lower space 168 is completely filled with water which can enter through the water vent 220. Thus, water in addition to the durable steel construction can contribute substantial weight to the container 50 for the power stroke. As discussed above, preferably the container is weighted enough so that it falls out of the exit chute 140 into the surrounding water 44. When the water sensor 220 detects the water pressure. The controller preferably is configured to recognize when sensed water pressure is above a threshold value, indicating that the container 50 has exited from the hull 40, and then to actuate the pneumatic ram 196 in order to push water out of the lower space 168. Preferably, simultaneously air from the tank 190 is vented into the upper space 166, through the opening 204, so as to increase the buoyancy of the container 50. Eventually the overall density of the container decreases to that it has sufficient buoyancy to begin floating upwardly. Preferably by this time the container will have been transferred to the side of the hull and the container 50 floats upwardly toward the top of the hull as shown in FIGS. 2 and 10, the container proceeds up.

As the container floats upwardly, the sensor 220 detects the change in surrounding water pressure, and in response the controller 172 stops operation of the ram 196 so as to not further increase buoyancy. As such, the now-buoyant container 50 floats upwardly toward the top of the hull 40 at a controlled pace. In some embodiments, as the container moves upwardly, the pneumatic ram may be retracted in order to further control and in some cases slow the container's ascent.

Figure 12:
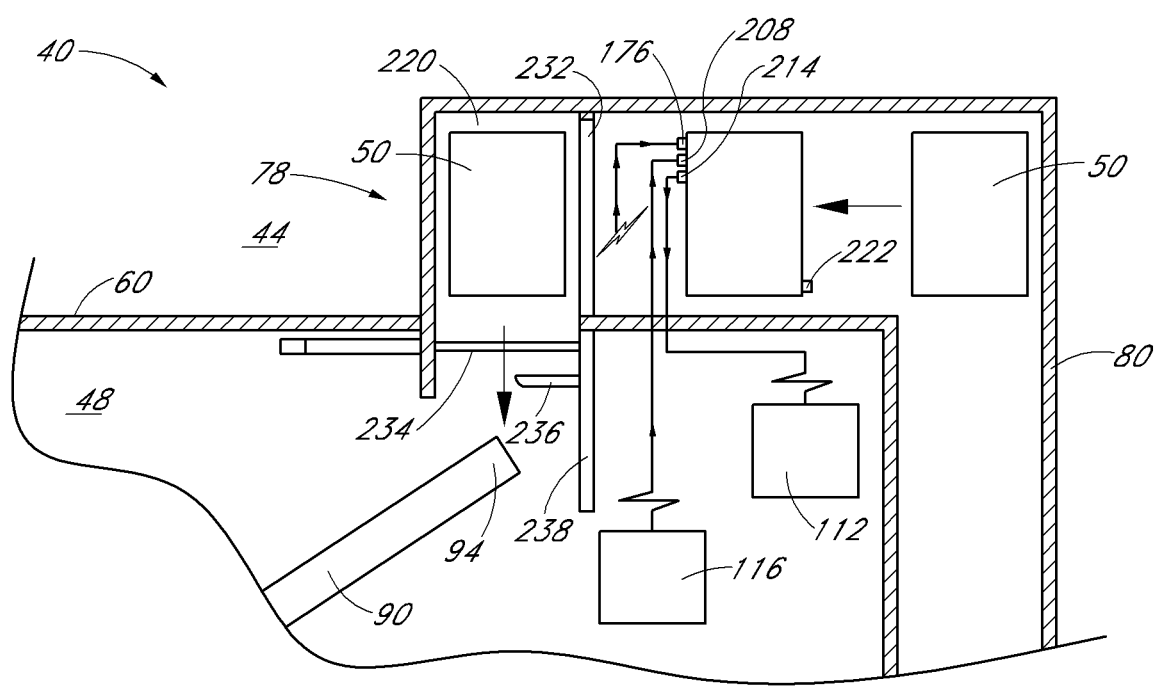
FIG. 12 is a schematic sectional view of an entry area of a submerged power generator as in FIG. 2 configured in accordance with one embodiment.

With additional reference to FIG. 12, once the container has reached the top of the hull 40, it is directed into the entry area 78, in which the container 50 is prepared for another power stroke, and again drawn into the hull air space 48. As shown, the container is preferably directed over the top of the hull 40, preferably by a mechanical apparatus such as an arm, crane or the like. The container 50 may then interface as appropriate with apparatus so as to prepare it for another power stroke. For example, the electronic unit 170 interface 176 can be engaged with a source of electricity to charge the battery 174 and/or a master control system of the hull, which can update control routines and exchange data with the controller 172. Also, the air pressure tank 190 can be recharged by connecting its interface 208 with, for example, the primary tank 116 of the hull 40. Additionally, through interface 214, air within the container upper space 166 may be vented from the container and/or may be directed to a scavenging tank such as the staging tank 112 for re-pressurization, thus facilitating full retraction of the pneumatic ram 196 and refilling of the lower space 168 with water through the at least one water vent 222.

In the illustrated embodiment, each of the interfaces connects independently with a respective resetting apparatus. It is to be understood, however, that, in other embodiments the interfaces may be combined into a single interface structure which may be engaged with the container interfaces manually and/or automatically such as by robot and the like.

In preparation for reentry into the hull 40, the container is advanced to an entry chamber 140. Preferably the container 50 proceeds through a sealed entry door 232 to enter the entry chamber 140. Preferably the entry door 232 is automatically operated such as by a pneumatic or hydraulic actuator, and creates a seal when closed. Thus, once the entry door 232 is closed, the container is separated from the surrounding body of water 44. In the entry chamber 140 further preparation can be performed, such as removal of water around the container and, in some embodiments, substantially drying the container. Such operations may advantageously be powered by pneumatic, hydraulic and/or electric tools.

When the container 50 is ready and the lever arm 90 is returned to its upper position, an entry hatch 234 is pneumatically opened and the container 50 proceeds downwardly. Preferably the container is supported by a support arm 236 that moves along a track 238 that controlledly guides the container 50 to a position at which it is latched securely onto the second end 94 of the lever arm 90. Once the container 50 is securely latched to the lever arm 90, a new power stroke begins.

The embodiments described above in connection with FIGS. 2-12 have followed a container through an operation cycle of the power stroke, exit, buoyancy stroke, and entry. It is to be understood that preferably a hull will have several containers 50 participating in the operation cycle simultaneously. For example, one first container may be performing a power stroke, another container may be within the fence and moving toward the side of the hull, yet another container may be advancing upwardly toward the top of the hull, still another container may be moving over the top of the hull, and a further container may be undergoing final preparation before another power stroke. For maximal efficiency, preferably sufficient containers are employed so that a container is always ready for a power stroke when the lever arm returns to its upper position.

Figure 13:
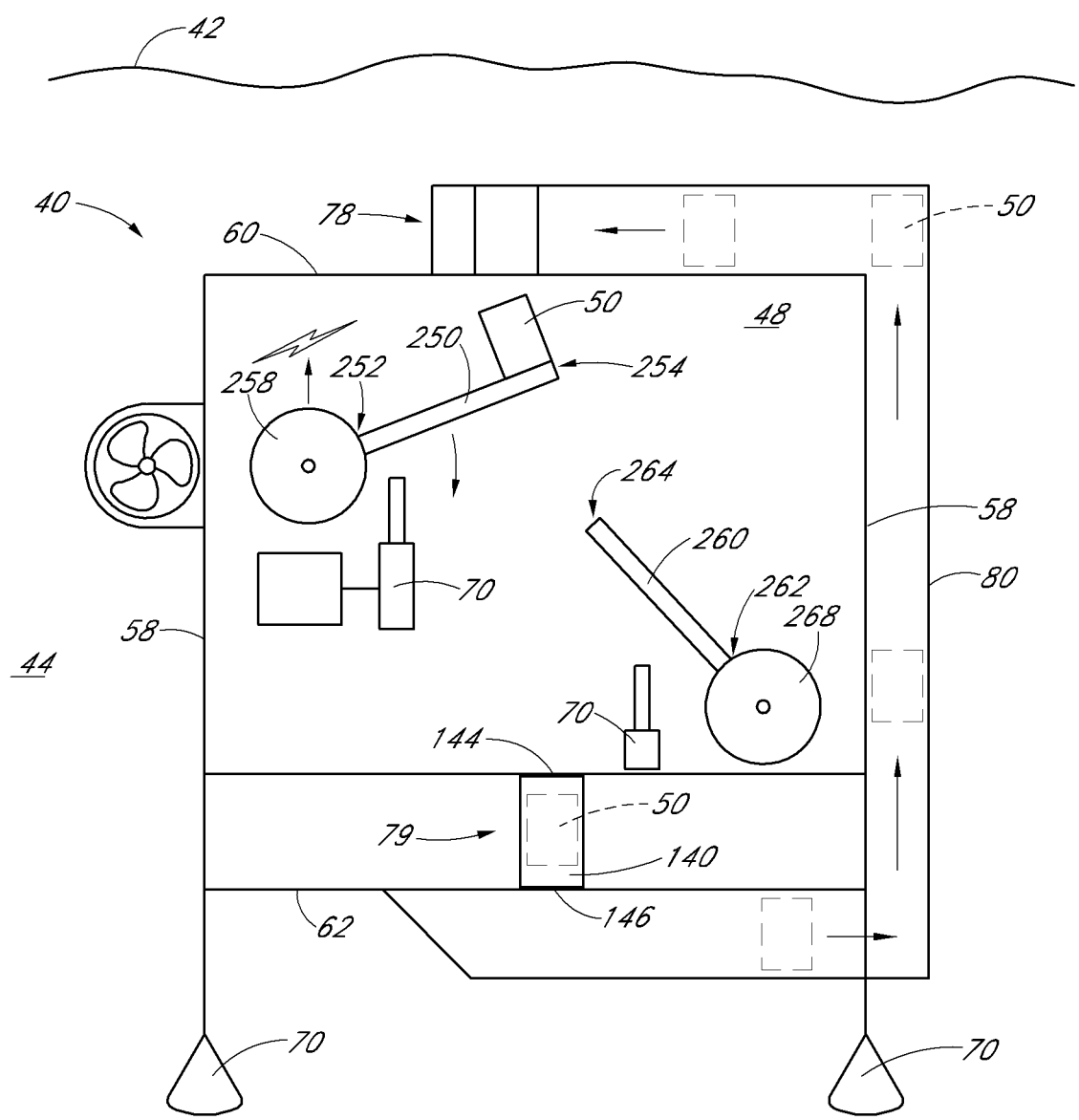
FIG. 13 is a schematic sectional view of another embodiment of a submerged power generator.
Figure 14:
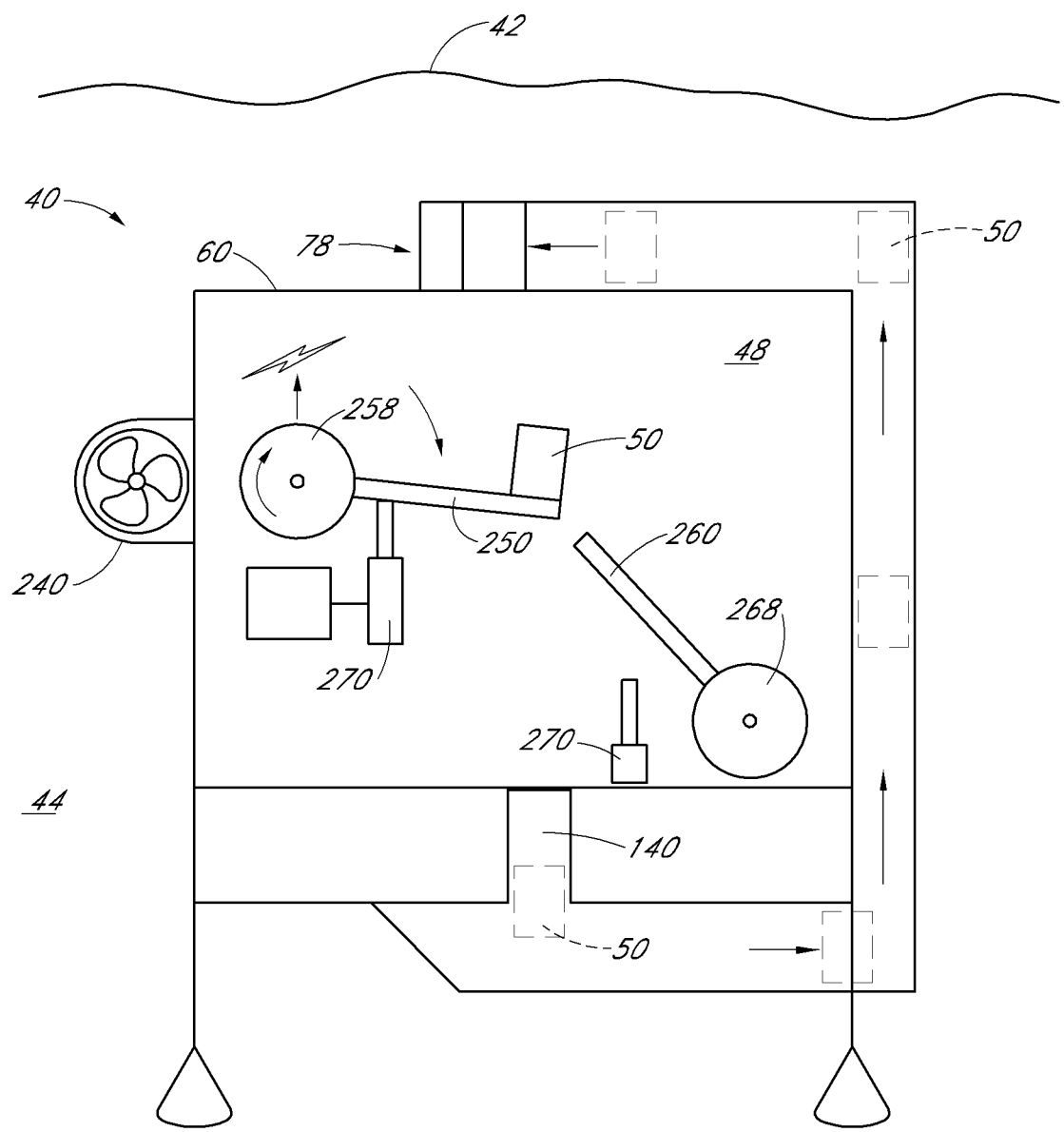
FIG. 14 shows the configuration of FIG. 13 during a gravity-driven power stroke.

With reference next to FIG. 13, another embodiment of a submerged power generator is illustrated. This embodiment also discloses a hull 40 that encloses an air space 48 and is submerged under the surface 42 of a body of water 44. The illustrated hull preferably has ballast 70 adapted to help keep it at a preferred depth. In the illustrated embodiment, one or more propulsion/steering devices 240, such as a water jet or impeller, are attached to the hull 40. One or several such devices 240 may be attached to the hull at various locations as desired to provided propulsion and steering.

In the embodiment illustrated in FIG. 13, the hull is not anchored to the bottom of the body of water 44. Rather, the hull 40 is maintained in the desired location by operation of propulsion devices 240, and/or the hull can be moved as desired. As with previous embodiments, the hull 40 preferably has a fence or guide 80 disposed about at least a part of the hull, an entry area 78 through which a weighted container 50 can enter the hull air space 48, and an exit area 79 through which a weighted container 50 can exit the hull air space. A power generating apparatus is disposed within the air space.

With additional reference to FIGS. 14-18, in this embodiment the power generation apparatus includes a first lever arm 250 having first and second ends 252, 254, a corresponding first flywheel 258 to which the first end 252 is drivingly attached, and a second lever arm 260 having first and second ends 262, 264 and a corresponding second flywheel 268 to which the first end 262 is drivingly attached. As shown, the lever arms 250, 260 preferably are biased to an upper position as shown in FIG. 13.

In operation, a weighted container 50 is attached to the second end 254 of the lever arm 250, and as the container falls during a first power stroke it drives the flywheel so as to drive an electricity generator. As the first lever 250 approaches the end of its range of rotation, it preferably engages a compressor 70, which engagement brakes the falling container and converts kinetic energy into compressed air.

Figure 15:
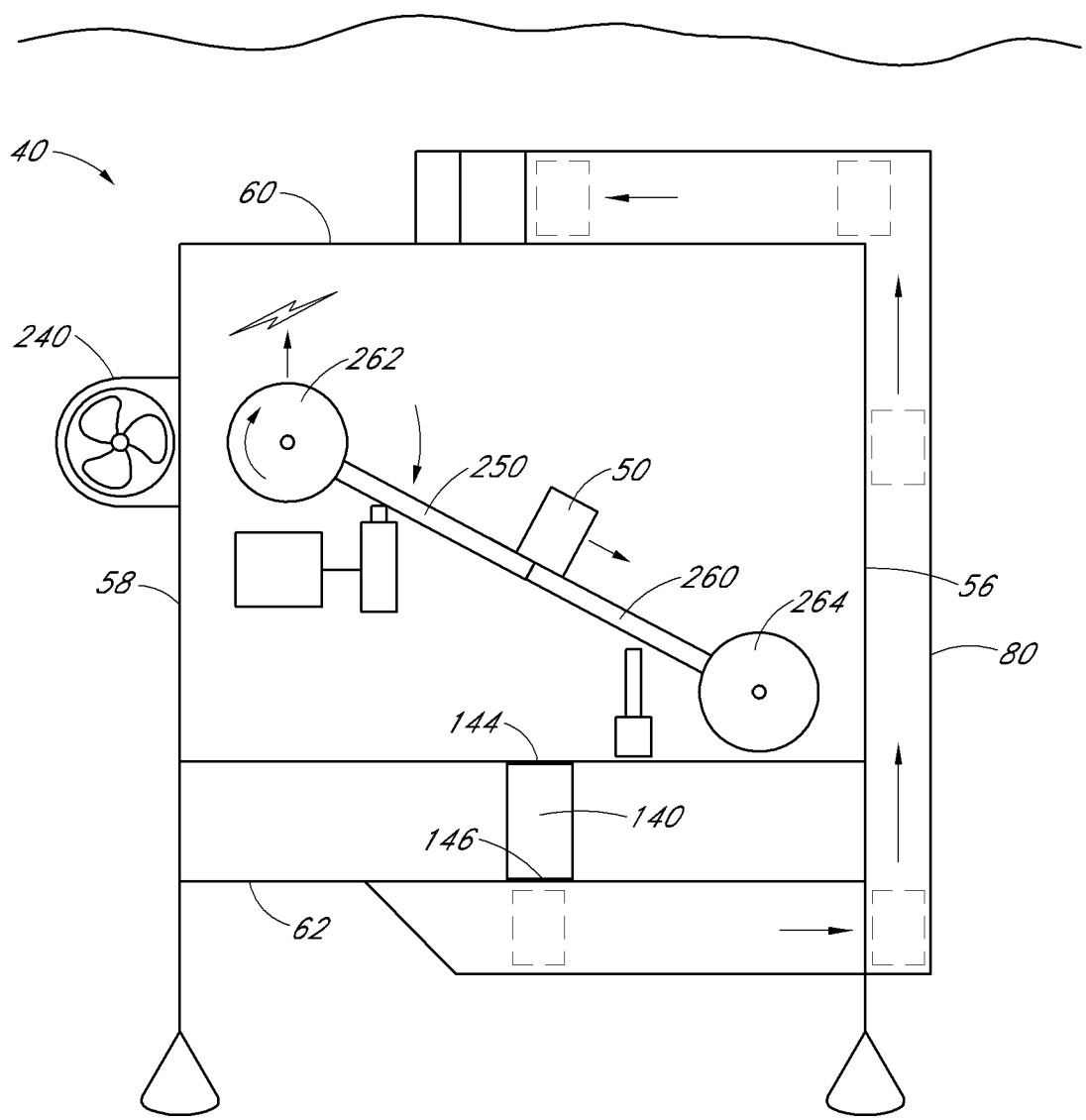
FIG. 15 shows the configuration of FIG. 13 farther along during the gravity-driven power stroke.
Figure 16:
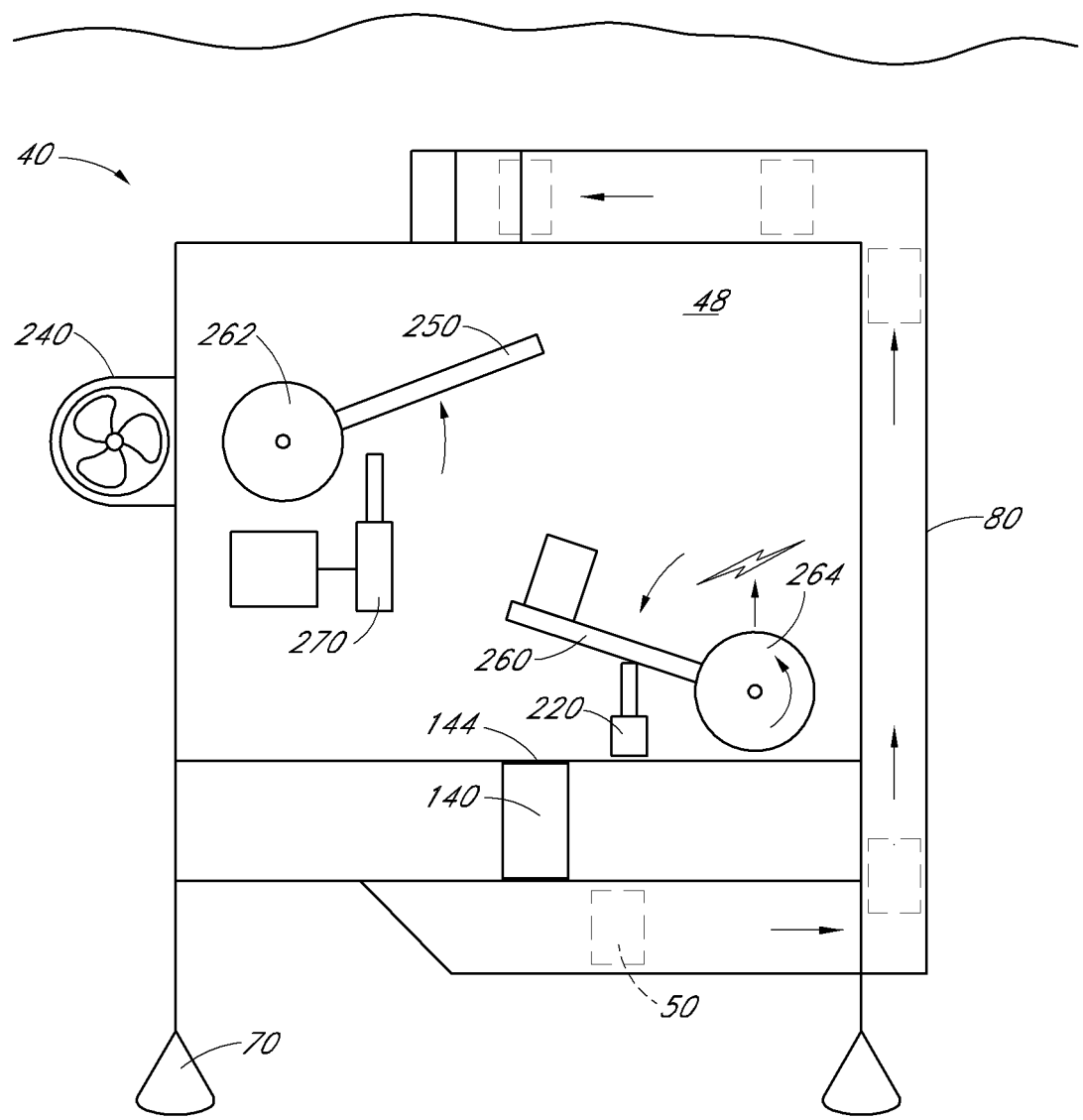
FIG. 16 shows the configuration of FIG. 13 still farther along during the gravity-driven power stroke.

With particular reference to FIG. 15, when the first arm 250 reaches its lowest point, it preferably is substantially aligned with the second arm 260, which is in its upper position. The container 50 is released from the first arm 250 and slides, rolls or otherwise translates over to the second arm 260, to which it connects. After the transfer, the container continues to fall, but now rotates the second arm 260 downward, driving the flywheel 268 and an associated generator as a second power generation stroke. During the second power stroke the first arm 250 returns to its upper position.

Figure 17:
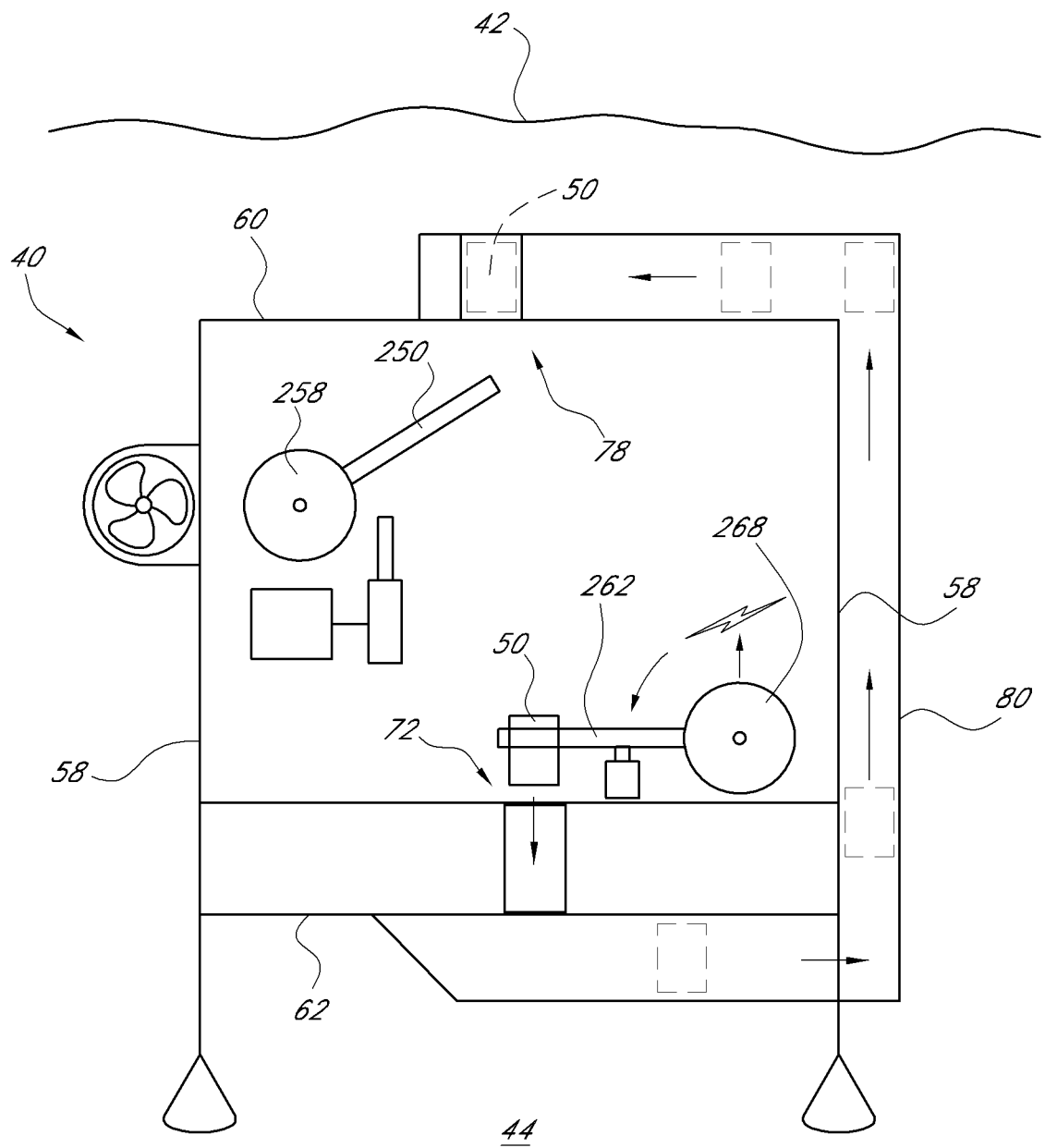
FIG. 17 shows the configuration of FIG. 13 yet farther along during the gravity-driven power stroke.
Figure 18:
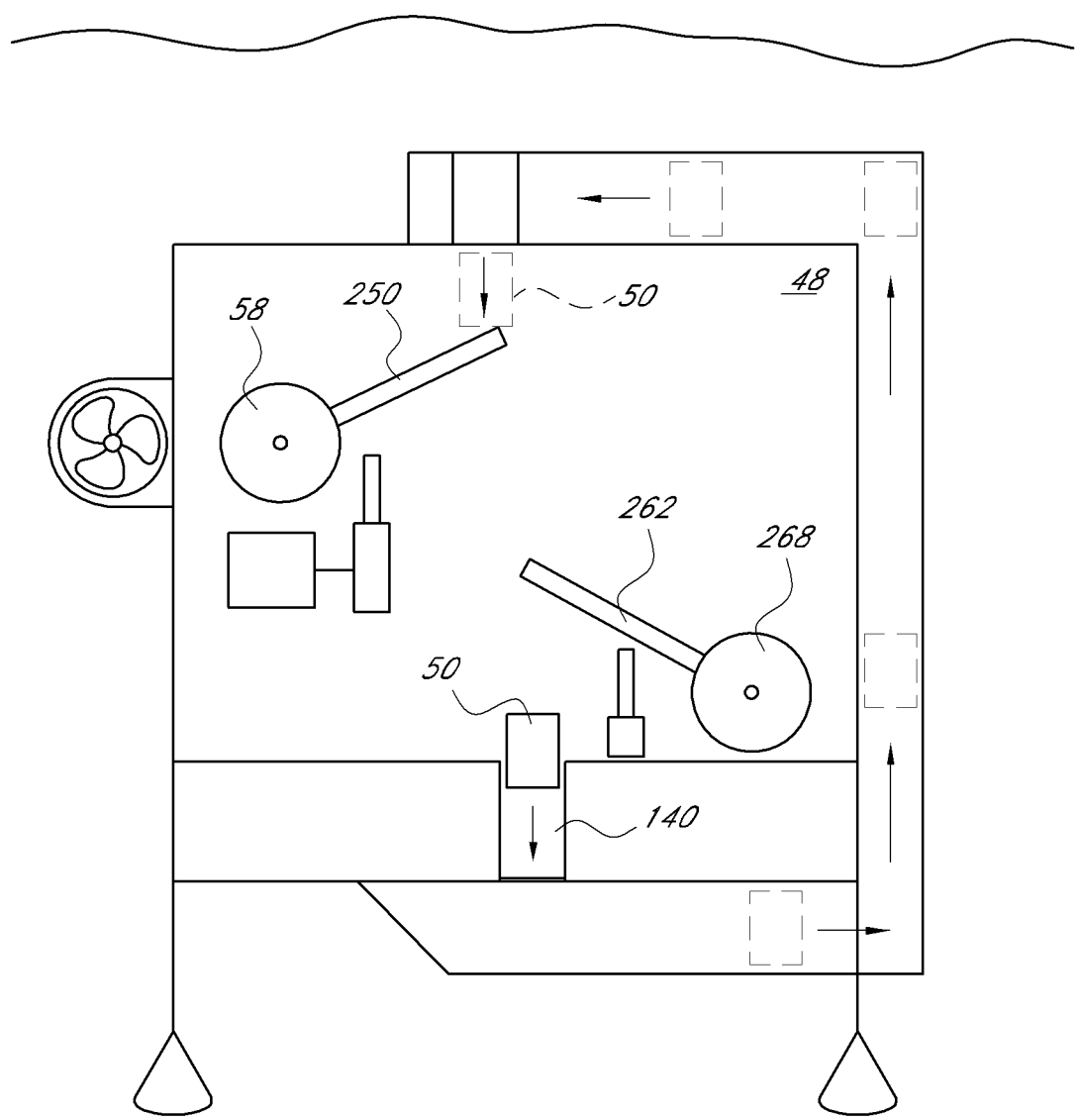
FIG. 18 shows the submerged power generator of FIG. 13 with the container entering an exit chute.

Upon completion of the second power generation stroke, as shown in FIG. 17, the container 50 is aligned with an exit chute 140, and an inner hatch 144 opens to allow access into the chute 140. The container is released from the second lever arm 260 and drops into the chute 140 as shown in FIG. 18. Now relieved of its weighted container, the second lever arm 260 returns to its recovered upper position. Meanwhile, as shown in FIG. 18, another container enters the air space and engages the first lever arm 250 so as to start the first power stroke again. At this point of operation the power generator is again in the configuration shown in FIG. 13. With reference again to FIG. 14, as the next first power stroke begins, preferably the container 50 in the exit chute 140 exits through the outer hatch 146 into the body of water 44 so as to begin the buoyant stroke.

Figure 19:
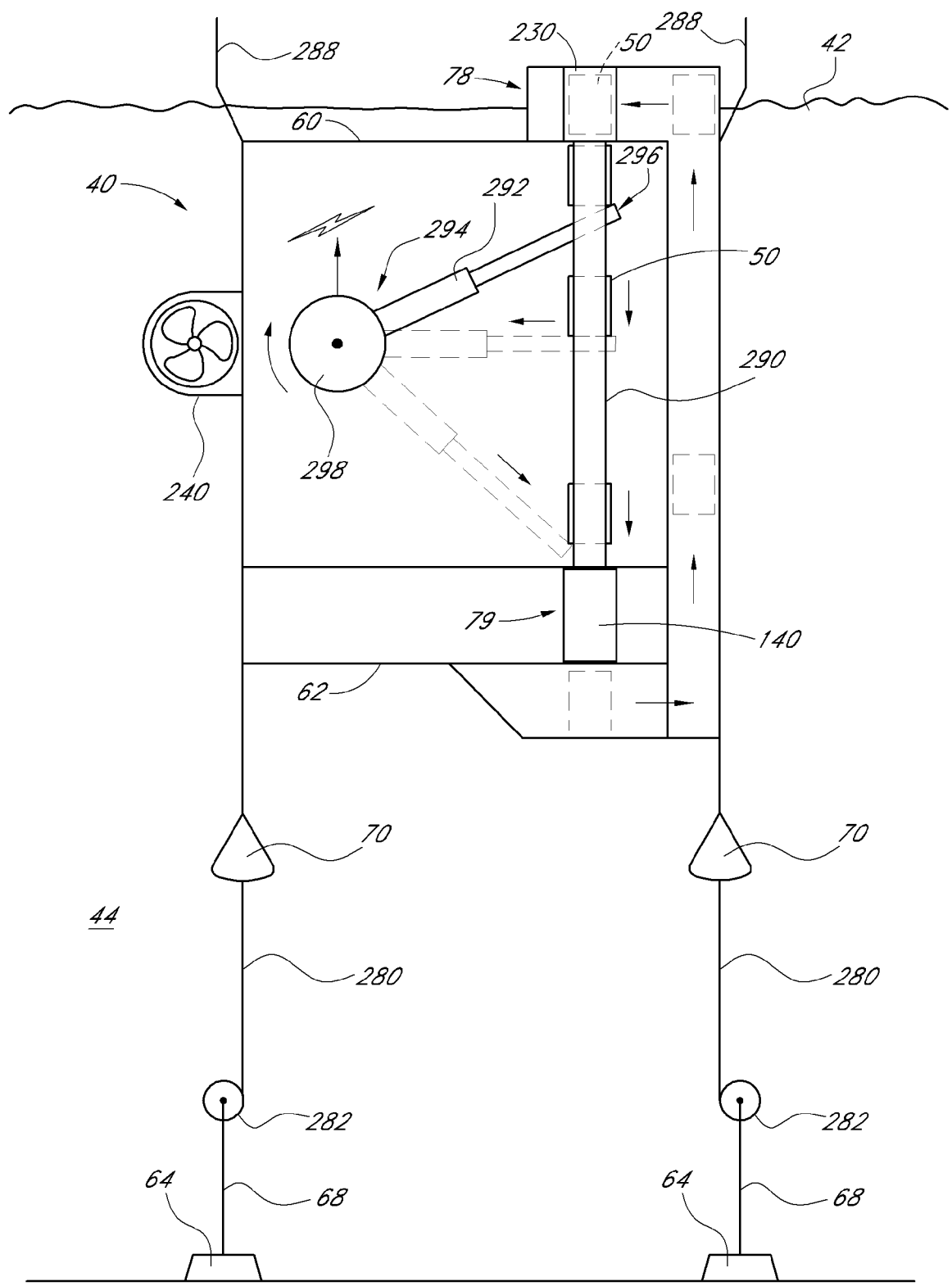
FIG. 19 shows another embodiment of a submerged power generator.

With reference next to FIG. 19, yet another embodiment of a submerged power generator is disclosed. In this embodiment, the hull 40 is connected by cables 280 to motorized pulleys 282 that are in turn connected by cable 68, chain or the like to anchors 64 embedded in the floor of the body of water 44. The motorized pulleys 282 can be employed to adjust the depth of the hull. Additionally, preferably one or a plurality of propulsion/steering units 240 is provided to provide stability for the hull 40 in response to changing conditions such as ocean currents, wave action or the like. For example, such propulsion/steering devices 240 could change the direction the hull faces relative to wave action so as to minimize any effect such action may have upon the hull.

In the embodiment illustrated in FIG. 19, a breakwater 288 extends generally upwardly and outwardly from the hull 40. Preferably the breakwater 288 stills wave action so that any water in a working area of the top of the hull is generally calm. In the configuration shown, part of the hull extends above the surface 42 of the water. Thus, any water pressures affecting the entry area 78 are comparatively low and workers can more easily work directly with the containers 50. Additionally, since the generator is at least partially submerged, the buoyant containers float substantially to the top surface 160. In other configurations, the top surface 60 of the hull 40 is above the surface 42 of the water so that it is a generally dry environment. In such a configuration, an apparatus such as a crane or the like may be employed to lift containers floating on the surface of the water onto the top surface of the hull. The containers are then in a substantially dry, non-pressurized work environment and both preparation of the containers and entry of the containers into the hull air space is facilitated.

In still another embodiment, the power generator is configured to selectively operate in a range of configurations ranging from a configuration in which the top surface 60 of the hull is disposed above the surface of the water to a fully submerged configuration. For example, during good weather the hull may be raised, exposing the top surface 60 and providing a dry, relatively easy work area at the entry area 78 of the hull. But in the case of inclement weather or excessive wave action, the pulleys 282 may be actuated so as to pull the hull completely underwater to a depth at which the hull is substantially unaffected by the weather above, and power generation may continue.

In the embodiment illustrated in FIG. 19, a generally vertical track 290 is defined between the entry chamber 230 and the exit chute 140. The containers 50 engage and are guided by the track 290 as they fall during a power stroke. A telescoping lever arm 292 has a first end 294 connected so as to drive a flywheel 298 and a second end 296 positioned to support the container 50. As the container falls, the lever arm 292 telescopes so as to accommodate the change in radius resulting from the vertical track. Braking systems, such as discussed in previous embodiments, may be used as desired. Upon completion of a power stroke, the container 50 enters the exit chute 140 and is ejected from the hull 40.

Figure 20:
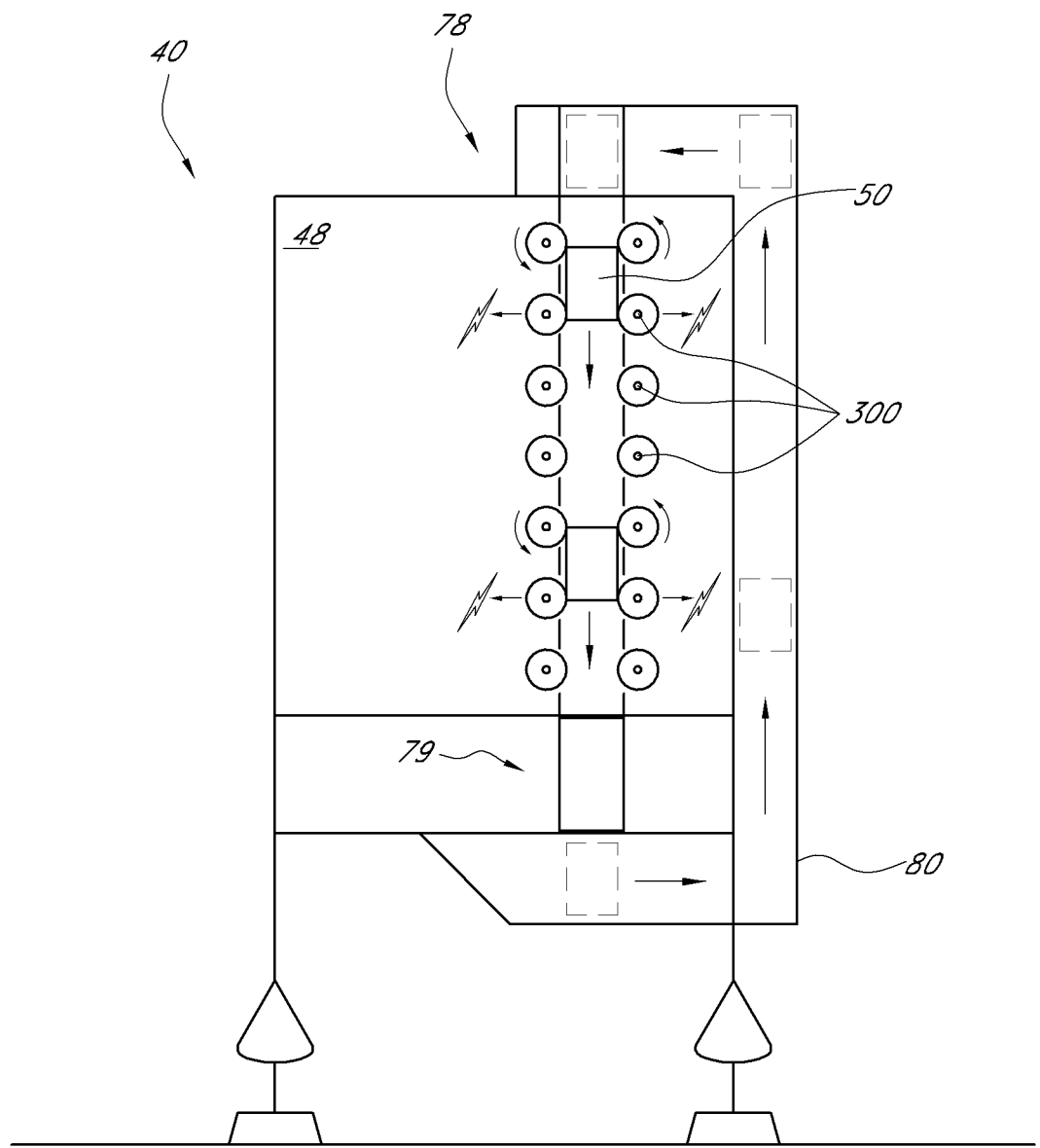
FIG. 20 shows still another embodiment of a submerged power generator.

With reference next to FIG. 20, yet another embodiment of a submerged power generator is illustrated. In this embodiment, the entry chamber 230 and exit chute 140 are again aligned and the containers 50 fall along a generally vertical shaft or path from entry to exit. A plurality of rollers 300 are disposed along the fall path. As the containers 50 fall, they contact and turn the rollers 300, which in turn drive power generators. In one embodiment, each roller 300 drives its own electricity generator in a manner that may be similar to automotive regenerative braking systems. In other embodiments, rotation of the rollers drives a common drive shaft which in turn drives a electricity generator.

In still another embodiment, magnetic poles are disposed along the fall path, and magnetic poles are also provided on the containers 50. As such, when the containers fall along the fall path, the container poles passing the fall path poles acts as a linear electricity generator in addition to the electricity generated when the rollers to drive a mechanically-driven electricity generator. Still other embodiments may employ only the linear electricity generator.

The embodiment of FIG. 20 is particularly amenable to having multiple containers 50 falling in their respective power stroke in the same fall path at the same time. Preferably the exit area 79 structures operate quickly so that the containers can be ejected from the hull without backing up. Also, preferably the rollers 300 provide adequate braking to provide a controlled power stroke. In some embodiments, an air space within the hull can have a plurality of fall paths that may direct containers into a common fence 80 structure. In other embodiments each fall path has its own dedicated fence structure.

Figure 21A:
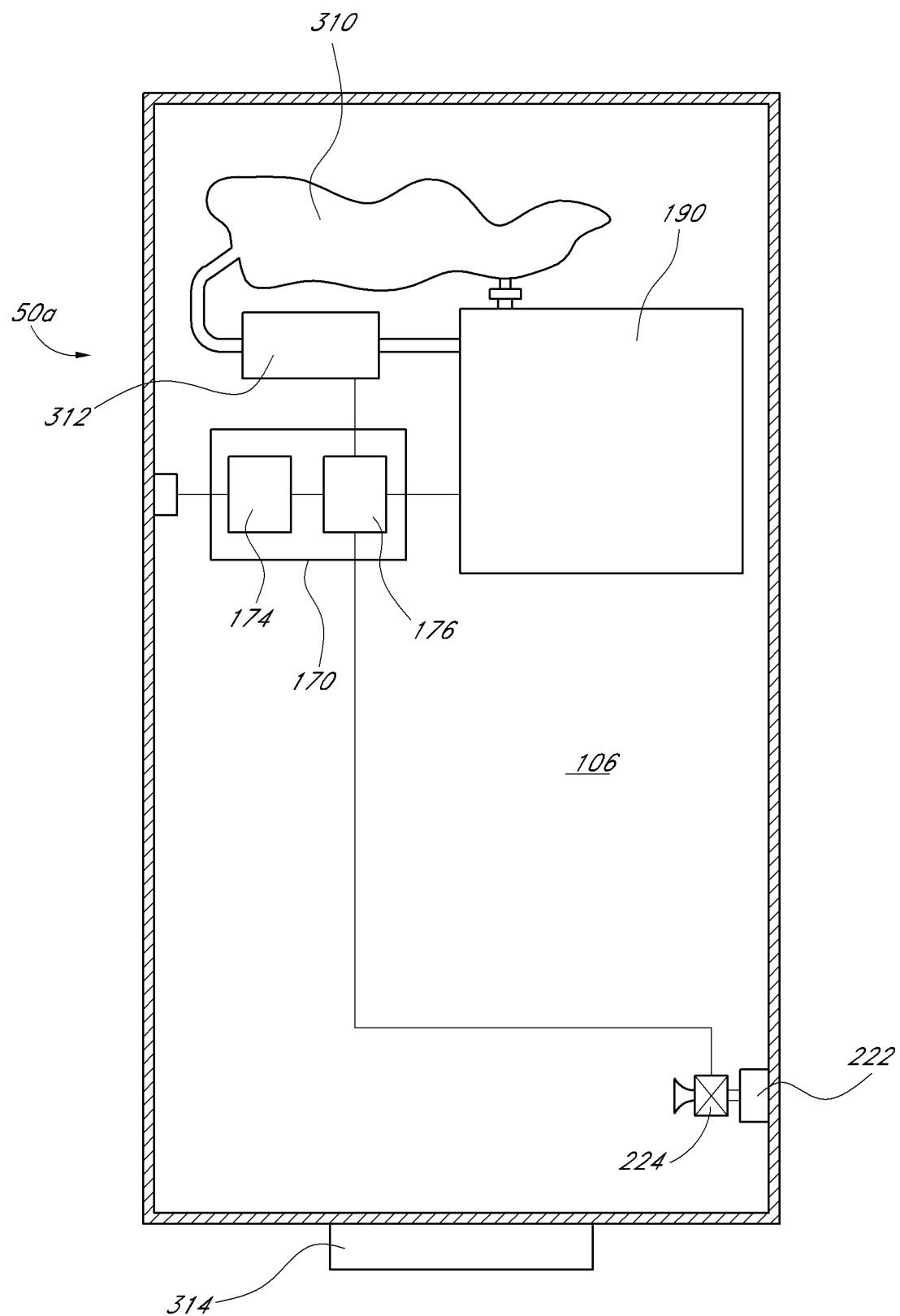
FIG. 21A is a cross-sectional view of another embodiment of a weighted container such as the container of FIG. 3.
Figure 21B:
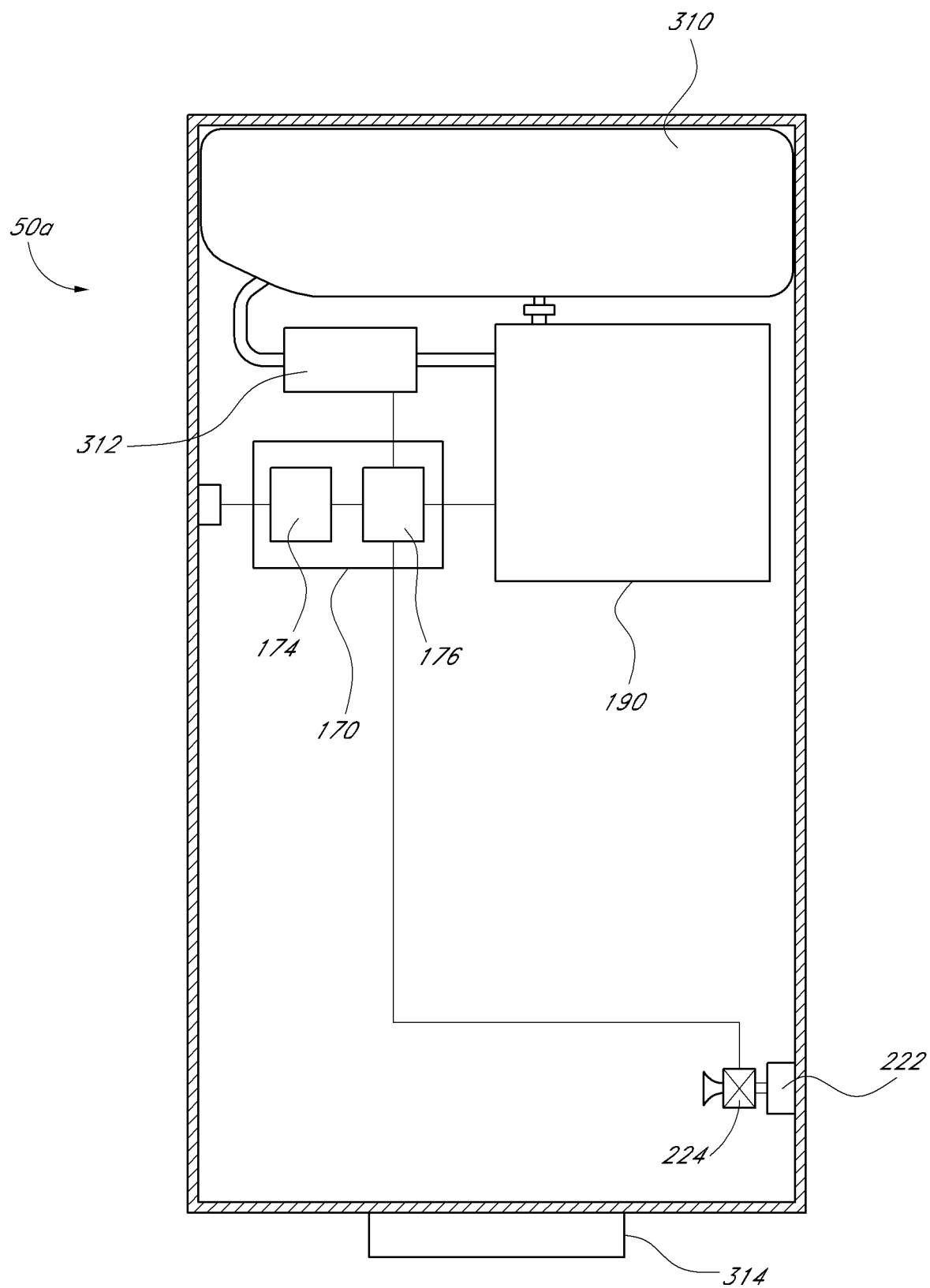
FIG. 21B shows the container of FIG. 21A but with a bladder inflated.

With reference next to FIGS. 21A-B, yet another embodiment of a container 50a is illustrated in section, showing internal components schematically. In this embodiment, an electronic unit 170 comprising a controller 172 and a power source such as a battery 174 is provided within the container 50a as well as a pressurized air tank 190 connected so as to provide air to a bladder 310. The bladder 310 is also connected to an electricity-driven air compressor 312. A water vent 222 is also provided for entry of water into the space 106 defined within the container 50a. Preferably, water can fill substantially an entire container, particularly with the bladder 310 uninflated as shown in FIG. 21A.

Upon exit of the container from the hull air space 48, preferably the controller 172 directs the pressurized air tank 190 to fill the bladder 310, thus increasing the buoyancy of the container 50a sufficient so that the container achieves positive buoyancy so it starts to float upwardly. Upon reaching the top of the hull in preparation for another power stroke, the controller 172 directs the compressor 312 to remove the air from the bladder 310 and recompress it into the air tank 190. Also, the water vent valve 224 is opened so as to enable the surrounding water to again fill the space 106 within the container 50a, thus helping the container achieve its greatest weight. The container 190 is then ready for another power stroke.

The container 50a of FIG. 21A-B also preferably includes a shock absorber 314 attached to its bottom surface. The shock absorber 314 helps absorb impacts that may occur during operation of the power generator. In a preferred embodiment, the shock absorber 314 comprises an elastomeric material such as hard rubber, which serves the purpose of absorbing impacts but is also relatively heavy yet buoyant. Of course other materials and mechanisms can be employed.

Still other container embodiments may employ a control system made up of non-electronic controllers. For example, a mechanically-actuated pressure sensor may mechanically trigger opening a pneumatic valve upon exposure to a first threshold external water pressure, thus increasing the buoyancy of the container, and mechanically trigger closure of the pneumatic valve when exposed to a second, lesser threshold external water pressure so that buoyancy of the container is modified without use of electricity and/or without electronic input.

Figure 22:
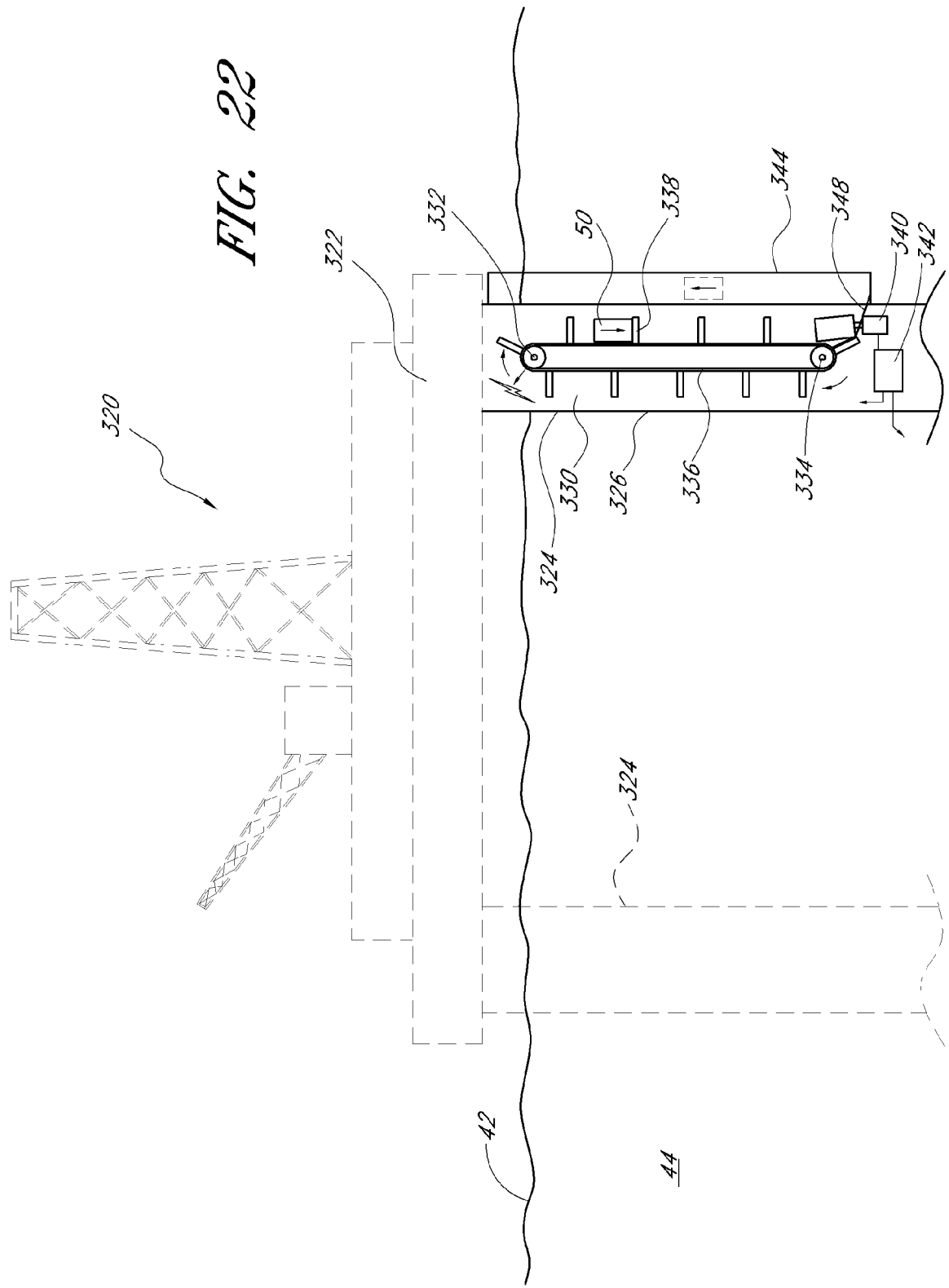
FIG. 22 is a schematic view of an embodiment in which a submerged power generator is incorporated into an industrial complex.

With reference next to FIG. 22, another embodiment is shown in which a water-borne industrial complex 320 employs a submerged power generator. In the illustrated embodiment the water-borne industrial complex 320 is an oil-drilling rig having a platform 322 and a plurality of legs 324 that extend downwardly into the water 44 to a substantial depth. In the illustrated embodiment, at least one of the legs 324 is substantially hollow and is configured to define a leg hull 326 having an air space 330 within which a power generating apparatus is provided.

In the illustrated embodiment, a conveyor 336 is supported by first and second pulleys 332, 334 so that the conveyor 336 runs generally vertically in the leg hull 326. A plurality of supports 338 are connected to the conveyor 336 so as to move vertically with the conveyor. Each support 338 is configured to support a weighted container 50. As the containers and corresponding supports 338 fall during the power stroke, the supports 338 drive the conveyor 336, which in turn drives the pulleys 332, 334. The pulleys in turn drive an electricity generator so as to provide power to the industrial complex 320 on the platform 322.

As with other embodiments, once the power stroke is completed the container 50 is braked, preferably by an air compressor 340 configuration which converts kinetic energy of the falling container 50 into pressurized air stored in an air tank 342.

At the bottom of the power stroke, preferably a removal guide grate 348 is provided. Preferably the container supports 338 on the conveyor 336 are also grated so that the supports 338 can pass through the guide grate 348 without contacting it, but the containers 50 are directed by the guide 348 off of the support 338 and towards an exit area 79. The container is then ejected from the leg hull 326 into a fence or guide 344 adjacent the hull, and the container commences the buoyant stroke. In this embodiment, preferably pressurized air generated during the power stroke is directed to the platform to be used to operate tools and machinery and can also be directed to the depths of the water to assist the drilling operation.

With reference next to FIGS. 23A-D, another embodiment of an exit area 350 is illustrated. In this embodiment, an aperture 352 is formed through a side wall 58 of the hull and a pneumatically operated hatch 354 sealingly closes the aperture 352. A generally horizontal chamber 360 is defined between an upper chamber wall 362 and a lower chamber wall 364. An inclined floor 366 directs a container 370 onto the lower chamber wall 362 so that its slides into the chamber 360. A pneumatically- or hydraulically-operated piston 372 and an accompanying push plate 374 are positioned so that the push plate 374 seals the chamber 360. A mount 375 is also secured in place to provide a secure base for the piston 372.

In this embodiment, the container 370 has a different configuration than in some of the other embodiments disclosed herein. In this embodiment the height of the container is relatively small compared with its length and width. Again, such a configuration preferably minimizes the surface area of the surface first exposed to the pressurized water during ejection at depth.

Figure 23A:
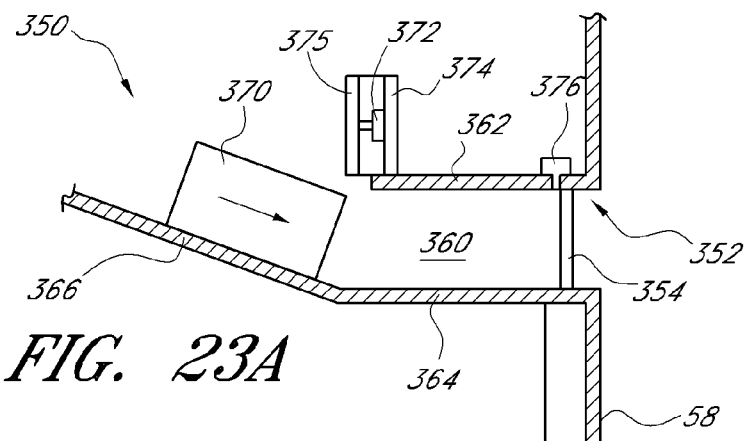
FIGS. 23A-23D schematically show another embodiment of an exit area at stages during an ejection process.
Figure 23B:
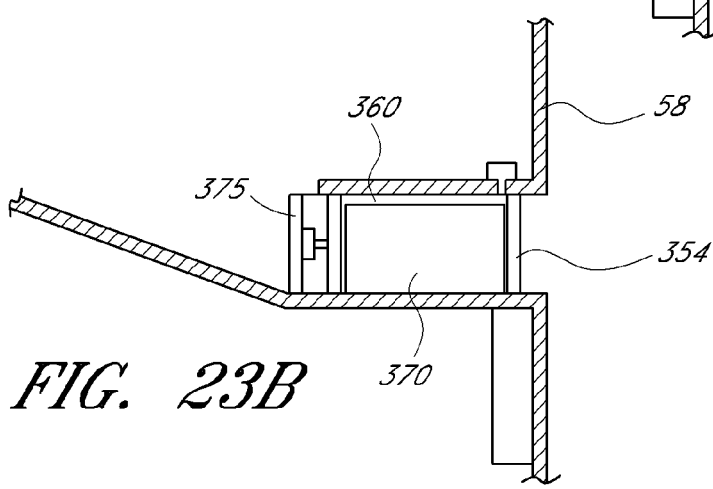
Figure 23C:
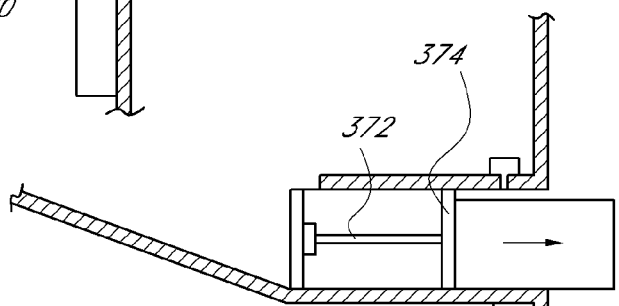
Figure 23D:
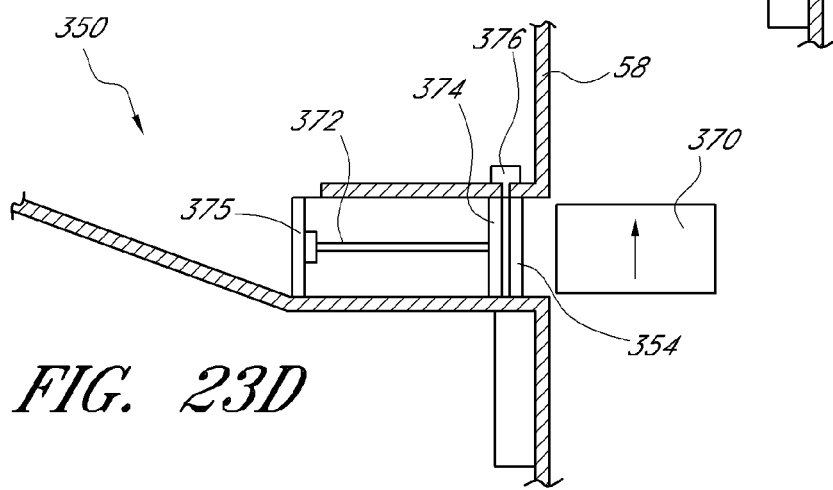

As shown in FIG. 23A, the container 370 slides into the chamber 360, and the push plate 374 is put in place behind the container 370, creating a seal with the chamber walls. Once the chamber is sealed as shown in FIG. 23B, the outer hatch 354 is opened and the pneumatic ram 372 actuated so that the sealing push plate 374 urges the container 370 out of the side 58 of the hull. Since the push plate 374 preferably is sealed against the upper and lower chamber walls 364, 362, there is little to no incursion of water into the chamber 360 during this process. When the container is ejected, preferably the push plate 374 is positioned adjacent the location of the outer hatch 354, which is immediately closed, thus sealing the chamber 360. The push plate 374 is then withdrawn. Preferably an air valve 376 is provided so that as the push plate is withdrawn, air from within the hull air space can be drawn into the chamber 360 to avoid creation of unnecessary vacuum that would resist such withdrawal.

In the illustrated embodiment, the container is not variably buoyant. More specifically, the container 370 does not necessarily have a control system or equipment configured to change its buoyancy once ejected from the hull 50. Rather, it is biased to be buoyant at the depth of the exit chamber 360. As such, as soon it is ejected from the hull, the container 370 will begin to float upwardly with no active management. Further, in this embodiment the containers do not need much maintenance to be prepared anew for each power stroke. Also, such containers may or may not be filled fully or partially with water, but may be filled with or unitarily made out of another substance, such as hard rubber. As such, it is to be understood that the term "container" as used herein is a broad term corresponding to a structure having a mass and some degree of or potential for buoyancy.

The embodiments disclosed above demonstrate various principles, features and aspects in connection with certain embodiments of a submerged power generator. It is to be understood, however, that the principles described herein can be applied with other structures employing the principles described herein. For example, the illustrated embodiments illustrate some structural examples. It is to be understood that Applicants have contemplated other mechanical structures having somewhat different structures than shown specifically herein but still employing principles discussed herein. Further, other embodiments may employ still different shapes and sizes. For example, in other embodiments, the hull can have non-rectangular shapes. Additionally, the illustrated embodiments show the hull submerged and ballasted from the bottom and including being anchored to the bottom. Preferably the hull is towed such as by a barge to its operational location and then submerged. In various embodiments, it can be submerged to a point of neutral buoyancy or may be configured to be buoyant but anchored to the bottom of the body of water. In still other embodiments, the hull can be configured to have negative buoyancy, but be supported from above by a ship hull, industrial superstructure, buoys or the like.

The features and principles discussed in the illustrated embodiments have been discussed in the context of a body of water and a submerged hull enclosing an air space therewithin. It is to be understood that the principles discussed herein can be employed in other environments such as any environments having a first and a second fluid, the first and second fluids having different densities. For example, a hull defining a space holding a first gas having a relatively light density can be submerged in a second fluid having a greater density than the first fluid. Weighted containers can be cycled through, into and out of the hull to generate power strokes as disclosed above.

In the illustrated embodiment, the pressurized air system was depicted as having a plurality of tanks. It is to be understood that the pressurized air system can involve more or fewer tanks as desired. For example, tanks can be provided having specific ranges of pressurized air that are optimized for operating and driving particular tools. Preferably a system comprising a plurality of valves and sensors directed by a controller can be provided for distributing pressurized air to the tanks in a controlled manner.

As discussed above in connection with FIG. 22, a submerged power generator can advantageously be employed in an industrial context. The illustrated embodiment showed the submerged power generator employed in the context of an oil rig. It is to be understood that other industrial applications such as manufacturing facilities, foundries and the like can employ principles discussed herein. For example, a floating foundry can be provided in which the molten metal is treated and formed. Such a foundry would have ready access to cooling water from the surrounding body of water, thus saving energy in acquiring such water. Additionally, much of the tooling can be driven by compressed air that was pressurized by the power generator. As such, a floating industrial complex can be substantially self-powered and take advantage of the surrounding supply of water and operate on efficiencies made to access to cold water and the like.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. For example, the linear generator discussed in connection with embodiments as in Figure can also be used with embodiments as in FIG. 19, and one or more of the embodiments for ejecting containers from within a hull can be used with embodiments as in FIG. 22. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A submerged power generator, comprising:
a hull configured to enclose an air space, the hull configured to be submerged in a body of water, the hull having an entry area and an exit area and an air tank configured to selectively deliver pressurized air, the entry area being disposed above the exit area such that the entry area is at a first depth and the exit area is at a second depth;
at least one weighted container;
the entry area configured so as to selectively allow the weighted container to enter the air space, the entry area comprising an outer door and a hull entry door;
the exit area configured to selectively eject the weighted container into the surrounding body of water, at least the exit area of the hull being configured to be pressurized with air from the air tank to a pressure that approximates or exceeds the hydrostatic pressure of the surrounding body of water at the second depth;
an electric power generation system disposed within the hull air space, the electric power generation system configured to engage the weighted container within the air space and convert energy lost by the weighted container as it is drawn downward by gravity into electricity; and a pneumatic power generation system disposed within the hull air space, the pneumatic power generation system comprising multiple compressors arranged in stages so that one or more of the compressors may compress air to a higher pressure than others of the compressors, the pneumatic power generation system configured to engage the weighted container within the air space and to pressurize air by converting energy lost by the weighted container as it is drawn downward by gravity, the pressurized air being stored in the air tank;

wherein the weighted container enters the hull air space at the entry area;

wherein the weighted container is configured to fall through at least some of the hull air space, the weighted container also being configured to engage the electric power generation system and the pneumatic power generation system as it falls within the hull air space;

wherein the weighted container enters the exit area and is ejected out of the exit area into the surrounding body of water, the ejection being facilitated by gravity acting on the weighted container and by pressurized air pushing on the weighted container;

wherein, after ejection of the weighted container, at least some of the pressurized air is transferred back to the air tank;

wherein, after ejection, the weighted container being buoyant in the surrounding water and thereby configured to float upwardly;

wherein, with the outer door open, the weighted container is received in the entry area; and wherein, with the outer door closed and the hull entry door open, the weighted container can again enter the hull air space by force of gravity.

2. A submerged power generator as in claim 1, wherein the electric power generation system comprises a mechanical apparatus that engages the container and is adapted to drive an electricity generator as the container falls.

3. A submerged power generator as in claim 1, wherein the hull is configured to be positively buoyant and is attached to an anchoring system configured to anchor the hull to a floor of a surrounding body of water, wherein the anchoring system is configured to selectively change the depth of the hull.

4. A method of generating electricity, comprising:
providing a hull at least partially submerged in a body of water, the hull configured to enclose an air space therewithin and having an entry area and an exit area, the entry area being disposed above the exit area such that the entry area is at a first depth and the exit area is at a second depth, the hull further including an air tank configured to selectively deliver pressurized air;
providing at least one weighted container;

wherein the entry area is configured so as to selectively allow the weighted container to enter the air space, the entry area comprising an outer door and a hull entry door;

wherein the exit area is configured to selectively eject the weighted container into the surrounding body of water, at least the exit area of the hull being configured to be pressurized with air from the air tank to a pressure that approximates or exceeds the hydrostatic pressure of the surrounding body of water at the second;

engaging the weighted container with an electric power generating system disposed within the air space and directing the weighted container to fall a power stroke distance within the air space so that energy from the falling weighted container is used by the electric power generating system to generate electricity;

engaging the weighted container with a pneumatic power generating system disposed within the air space so that energy from the falling weighted container is used by the pneumatic power generating system to produce pressurized air, the pneumatic power generating system comprising multiple compressors arranged in stages so that one or more of the compressors may compress air to a higher pressure than others of the compressors;

allowing the weighted container to enter the hull air space at the entry area;

allowing the weighted container to fall through the power stroke distance;

allowing the weighted container to enter the exit area;

ejecting the weighted container out of the exit area into the surrounding body of water, the ejection being facilitated by gravity acting on the weighted container and by pressurized air pushing on the weighted container;

allowing the weighted container to float upwardly due to the weighted container being buoyant in the surrounding body of water; and after the weighted container has floated upwardly, retrieving the weighted container and directing it through the entry area into the air space.

5. A method as in claim 4 additionally comprising braking the weighted container.

6. A method as in claim 5 additionally comprising mechanically engaging an apparatus moving with the container with an air compressor and pressurizing air as the container moves downwardly.

7. A method as in claim 6 additionally comprising directing the container into an exit chute in the exit area, and directing pressurized air into the chute above the container so as to push the container out of the exit chute into the body of water.

* * * * *